United States Patent
Schmidt et al.

(10) Patent No.: US 12,474,214 B2
(45) Date of Patent: *Nov. 18, 2025

(54) OPTICAL GAS IMAGING SYSTEMS AND METHOD COMPATIBLE WITH UNCOOLED THERMAL IMAGING CAMERAS

(71) Applicant: Fluke Corporation, Everett, WA (US)

(72) Inventors: Matthew F. Schmidt, River Falls, WI (US); Kirk R. Johnson, Rogers, MN (US)

(73) Assignee: Fluke Corporation, Everett, WA (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/298,864

(22) Filed: Apr. 11, 2023

(65) Prior Publication Data
US 2023/0247171 A1 Aug. 3, 2023

Related U.S. Application Data

(63) Continuation of application No. 17/054,096, filed as application No. PCT/US2019/033779 on May 23, 2019, now Pat. No. 11,641,441.
(Continued)

(51) Int. Cl.
*G01J 5/02* (2022.01)
*G01N 21/3504* (2014.01)
(Continued)

(52) U.S. Cl.
CPC .......... *G01J 5/026* (2013.01); *G01N 21/3504* (2013.01); *G06T 5/50* (2013.01);
(Continued)

(58) Field of Classification Search
CPC .......... G01J 3/0286; G01J 3/2803; G01J 5/07; G01J 5/025; G01J 5/0265; H04N 23/23;
(Continued)

(56) References Cited

U.S. PATENT DOCUMENTS

| | | | |
|---|---|---|---|
| 5,656,813 | A | 8/1997 | Moore et al. |
| 7,035,475 | B1 | 4/2006 | Chen et al. |

(Continued)

FOREIGN PATENT DOCUMENTS

JP 2014-219795 A 11/2014

OTHER PUBLICATIONS

McRae et al., "Backscatter absorption gas imaging: a new technique for gas visualization," Applied Optics, vol. 32, No. 21, Jul. 20, 1993, pp. 4037-4050.
(Continued)

*Primary Examiner* — Fabio S Lima
(74) *Attorney, Agent, or Firm* — Seed Intellectual Property Law Group LLP

(57) ABSTRACT

A thermal imaging system includes an infrared camera, a user interface, and a processor. While an actuation of the user interface is detected, the processor is configured to apply non-uniformity correction (NUC) values to infrared image data in infrared images of a target scene; register the corrected infrared images using image stabilization; perform an image-stabilized optical gas imaging process using the registered infrared images to generate optical gas image data indicating a change in the target scene; and generate a display image including the optical gas image data. Actuation of the user interface may be detected while a depressible trigger is depressed, and no longer detected when the depressible trigger is released. Upon detecting the actuation of the user interface, the processor may perform a NUC process to establish the NUC values. A drift indicator in the display image may indicate movement of the infrared camera from a reference position.

20 Claims, 17 Drawing Sheets

Related U.S. Application Data

(60) Provisional application No. 62/676,700, filed on May 25, 2018.

(51) Int. Cl.

| | | |
|---|---|---|
| *G06T 5/50* | (2006.01) | |
| *G06T 7/11* | (2017.01) | |
| *G06T 7/20* | (2017.01) | |
| *H04N 5/57* | (2006.01) | |
| *H04N 23/23* | (2023.01) | |
| *H04N 25/677* | (2023.01) | |
| *G01J 5/00* | (2022.01) | |
| *G01N 21/17* | (2006.01) | |
| *H04N 25/671* | (2023.01) | |

(52) U.S. Cl.
CPC ............ *G06T 7/11* (2017.01); *G06T 7/20* (2013.01); *H04N 5/57* (2013.01); *H04N 23/23* (2023.01); *H04N 25/677* (2023.01); *G01J 2005/0077* (2013.01); *G01N 2021/1795* (2013.01); *H04N 25/671* (2023.01)

(58) Field of Classification Search
CPC ........ H04N 25/677; G06T 2207/20221; G06T 2207/10048; G01N 21/274; G01N 25/72; G01N 2021/3531
See application file for complete search history.

(56) References Cited

U.S. PATENT DOCUMENTS

| | | | |
|---|---|---|---|
| 7,189,970 B2 | 3/2007 | Racca et al. | |
| 7,994,480 B2 | 8/2011 | Johnson et al. | |
| 8,654,328 B2 | 2/2014 | Tkaczyk et al. | |
| 8,760,509 B2 | 6/2014 | Schmidt et al. | |
| 8,822,922 B1 | 9/2014 | Scanlon et al. | |
| 9,464,984 B2 | 10/2016 | Schmidt et al. | |
| 10,267,686 B2 | 4/2019 | Kester et al. | |
| 11,022,546 B2 | 6/2021 | Schmidt et al. | |
| 2002/0071122 A1 | 6/2002 | Kulp et al. | |
| 2004/0074895 A1* | 4/2004 | Newcomb | G03F 7/70225 219/494 |
| 2006/0019042 A1* | 1/2006 | Nojima | B41M 5/52 428/32.24 |
| 2007/0081134 A1* | 4/2007 | Amano | G03F 7/70525 355/53 |
| 2009/0200466 A1 | 8/2009 | Mammen et al. | |
| 2009/0231588 A1 | 9/2009 | Sutton et al. | |
| 2009/0257679 A1 | 10/2009 | Hogasten | |
| 2010/0131225 A1* | 5/2010 | Carlson | G01J 5/02 702/130 |
| 2012/0169866 A1 | 7/2012 | Schmidt et al. | |
| 2013/0113939 A1* | 5/2013 | Strandemar | G06T 7/13 348/E5.09 |
| 2013/0147951 A1 | 6/2013 | Brown et al. | |
| 2013/0278771 A1 | 10/2013 | Magoun et al. | |
| 2013/0321637 A1* | 12/2013 | Frank | H04N 25/677 348/152 |
| 2014/0247365 A1 | 9/2014 | Gardner et al. | |
| 2015/0169169 A1 | 6/2015 | Andersson | |
| 2015/0269742 A1 | 9/2015 | Bergstrom et al. | |
| 2015/0316473 A1 | 11/2015 | Kester et al. | |
| 2015/0332441 A1 | 11/2015 | Högasten et al. | |
| 2015/0369730 A1 | 12/2015 | Schmidt et al. | |
| 2016/0019428 A1 | 1/2016 | Renner et al. | |
| 2016/0080666 A1 | 3/2016 | Stuart et al. | |
| 2016/0156880 A1 | 6/2016 | Teich et al. | |
| 2016/0238451 A1* | 8/2016 | Zeng | G06T 7/11 |
| 2017/0024871 A1* | 1/2017 | Schmidt | G06T 7/001 |
| 2017/0061663 A1 | 3/2017 | Johnson et al. | |
| 2017/0272655 A1 | 9/2017 | Sakurai | |
| 2018/0033704 A1 | 2/2018 | Suzuki et al. | |
| 2018/0063454 A1 | 3/2018 | Olsson | |
| 2018/0082430 A1* | 3/2018 | Sharma | G06T 7/246 |
| 2018/0096468 A1 | 4/2018 | Nguyen et al. | |
| 2018/0276469 A1 | 9/2018 | Richards et al. | |
| 2018/0335380 A1 | 11/2018 | Schmidt et al. | |
| 2019/0026867 A1* | 1/2019 | Peterson | G06T 5/20 |
| 2019/0116328 A1* | 4/2019 | Dock | G01J 5/0853 |
| 2019/0364227 A1 | 11/2019 | McManus et al. | |
| 2019/0378258 A1 | 12/2019 | Fan et al. | |
| 2020/0326276 A1* | 10/2020 | Viklund | H04N 23/631 |
| 2021/0344851 A1* | 11/2021 | Kester | H04N 23/11 |

OTHER PUBLICATIONS

Kulp et al., "Development of a pulsed backscatter-absorption gas-imaging system and its application to the visualization of natural gas leaks," Applied Optics, vol. 37, No. 18, Jun. 20, 1998, pp. 3912-3922.

Goers et al., "Development of a compact gas imaging sensor employing a cw fiber-amp-pumped PPLN OPO," Cleo, 2001, p. 521.

Quantitative Optical Gas Imaging QL320 Training, PowerPoint Presentation by Providence Photonics, LLC presented Apr. 5, 2018 at 4C Conference in San Antonio, Texas, 120 pages.

Zeng et al., "Detection Limits for Optical Gas Imaging," PowerPoint Presentation by Providence Photonics, LLC, 4C Conference in San Antonio, Texas, Apr. 35, 2018, 15 pages.

International Search Report and Written Opinion of the ISA/EP in PCT/US2019/033779, dated Sep. 20, 2019, 24 pgs.

* cited by examiner

| MENU > Camera > Gas Detection Mode | | |
|---|---|---|
| Gas Detection Mode: ON ◉ | Image Capture ○ | Tripod ○ |
| Gas Detection Mode: OFF ○ | Video Capture ◉ | Handheld ◉ |
| Custom | | |

FIG. 10

|  | Gas Amount 1 | Gas Amount 2 | Gas Amount 3 | ... | Gas Amount M |
|---|---|---|---|---|---|
| Gas Type 1 | $\Delta T(1,1)$ | $\Delta T(1,2)$ | $\Delta T(1,3)$ | ... | $\Delta T(1,M)$ |
| Gas Type 2 | $\Delta T(2,1)$ | $\Delta T(2,2)$ | $\Delta T(2,3)$ | ... | $\Delta T(2,M)$ |
| Gas Type 3 | $\Delta T(3,1)$ | $\Delta T(3,2)$ | $\Delta T(3,3)$ | ... | $\Delta T(3,M)$ |
| ⋮ | ⋮ | ⋮ | ⋮ | ⋱ | ⋮ |
| Gas Type N | $\Delta T(N,1)$ | $\Delta T(N,2)$ | $\Delta T(N,3)$ | ... | $\Delta T(N,M)$ |

FIG. 11

OPTICAL GAS IMAGING SYSTEMS AND METHOD COMPATIBLE WITH UNCOOLED THERMAL IMAGING CAMERAS

RELATED MATTERS

This application is a continuation of U.S. application Ser. No. 17/054,096, filed Nov. 9, 2020, as a U.S. national phase of PCT/US2019/033779, filed May 23, 2019, which claims the benefit of U.S. Provisional Patent Application No. 62/676,700, filed May 25, 2018, all of which are incorporated herein by reference.

BACKGROUND

Infrared imaging cameras are used in a variety of situations. For example, infrared imaging cameras are often used during maintenance inspections to thermally inspect equipment. Example equipment may include rotating machinery, electrical panels, or rows of circuit breakers, among other types of equipment. Infrared inspections can detect equipment hot spots such as overheating machinery or electrical components, helping to ensure timely repair or replacement of the overheating equipment before a more significant problem develops.

Depending on the configuration of the camera, the infrared imaging camera may also generate a visible light image of the same object. The camera may display the infrared image and the visible light image in a coordinated manner, for example, to help an operator interpret the thermal image generated by the thermal imaging camera.

Visible light and/or infrared imaging has been applied to the field of gas imaging, in which a user will inspect a target scene for the presence of a target gas, for example, to perform leak detection and remediation (LDAR) processes. Various methods include active gas imaging techniques, such as by actively illuminating a target scene with one or more particular wavelengths of light, or by passive gas imaging techniques.

Optical gas imaging systems can be difficult to use effectively in the field due to the often small changes that a gas cloud may have on an overall infrared image. Such changes may be too small to observe during typical camera operation. Additionally, without a sufficiently high signal to noise ratio in a thermal camera, noise (e.g., due to sensor/electronics drift, thermal fluctuations, component self-heating or other factors) may obscure subtle changes in the image due to gas, making gas recognition very difficult. In addition, the impact on the infrared image by a gas cloud will depend on the size (e.g., path thickness) and density of the gas cloud, neither of which is necessarily constant throughout a gas cloud. Thus, the degree and shape of the attenuation or augmentation from a gas cloud will vary within a scene as the gas cloud changes shape over time. Such changes in the image can be compounded by camera motion or motion within the scene, making such systems difficult to operate. These difficulties can be problematic since any one of them may cause the camera to display artifacts that can obscure gas within the scene, making it difficult to observe by a user.

In addition, gases selectively absorb/emit infrared radiation at specific wavelengths and can make normally invisible gases visible under certain conditions, for instance, by using a camera sensitive to the absorption/emission wavelengths (e.g., infrared wavelengths). Various factors contribute to whether the gas will be visible via infrared imaging, for example, during optical gas imaging, including the temperature difference between the gas and the apparent temperature of the scene background. This temperature difference often has a significant impact on the practical effectiveness of optical gas imaging cameras, for instance, during leak detection inspections. However, the apparent temperature difference can vary widely depending on ambient conditions and the camera operator's choice of viewing position, often requiring high levels of training for camera operators to ensure a proper viewing position and often contributing to inconsistent results between operators and gas imaging or LDAR surveys taken at different times.

Infrared cameras for gas imaging often use cryo-cooled sensor arrays, special spectral filters, and/or other optical devices to provide spectral separation in order to achieve an adequate signal to noise ratio to observe gas in a scene among noise and other image clutter. Uncooled infrared sensor arrays, with their broadband IR response and in view of the typically narrow IR absorption bands of gases often have low or inadequate signal-to-noise and/or gas signal vs background scene contrast (e.g., clutter) for effective optical gas imaging without these special spectral approaches.

Additionally, uncooled infrared sensor arrays are often subject to fixed-pattern noise, for example, due to pixel-to-pixel nonuniformity in the sensor array and/or the changing stray IR associated with camera self-heating and/or changes in ambient temperature that can clutter a scene and provide false data and/or obscure the ability to observe gas in a scene.

SUMMARY

Aspects of the disclosure relate to thermal imaging systems having an infrared camera module, a user interface, a display, a processor in communication with the user interface, the display, and the infrared camera module, and a memory in communication with the processor. The processor can be configured to capture infrared images via the infrared camera module. The memory can include instructions to cause the processor to perform various actions, such as upon a detected actuation from the user interface.

In some examples, the processor can be configured to perform a non-uniformity correction process to reduce or eliminate fixed pattern noise from infrared image data from the infrared camera module. The processor can capture infrared images of an infrared scene via the infrared camera module at a plurality of times. Each of the captured infrared images can be subject to the non-uniformity correction and registered via an image stabilization process.

The processor can perform an optical gas imaging process to generate optical gas image data emphasizing change in the infrared scene, and generate a display image including the generated optical gas image data for presentation on the display.

In some cases, the display image can include a drift indicator that indicates relative motion of the infrared camera module from a reference position. This can assist a user in maintaining a camera module stationary to reduce misalignment among captured image data. In some examples, the drift indicator comprises a first marker that indicates the reference position and a second marker that indicates the position of the infrared camera module relative to the reference position.

In some examples, a process of capturing images, registering the images, performing the optical gas imaging process, and generating a display image can be repeated for as long as the user interface is actuated. For example, in some cases, the user interface comprises a depressible trigger, and such steps can be performed and repeated for as long as the trigger is depressed, and stopped when the trigger is released. In some examples, upon release of the trigger, the processor is configured to perform a new non-uniformity correction process and then perform and repeat such a process until the trigger is released.

In some aspects, a thermal imaging system can include a processor configured to receive infrared image data from an infrared camera module and determine an apparent background temperature for each of a plurality of regions in the infrared image data. In some examples, the processor can receive data representative of a temperature of a target gas and, for each of the plurality of regions in the received infrared image data, compare the apparent background temperature for that region with the temperature of the target gas to determine a temperature difference value. The processor can compare the temperature difference value to a minimum temperature difference value associated with the target gas, and, if the temperature difference value is below the minimum temperature difference value, consider the region to lack sufficient contrast to reliably observe the target gas within the region.

Some systems can include an air temperature sensor in communication with the processor, wherein receiving data representative of the temperature of the target gas can include receiving air temperature information from the air temperature sensor.

In some examples, systems can include a display in communication with the processor. In some such embodiments, the processor can generate optical gas image data comprising a plurality of regions corresponding to the plurality of regions in the captured infrared image data. The processor can be further configured to generate display image data including the optical gas image data, the display image data having a plurality of regions corresponding to the plurality of regions in the optical gas image data and the infrared image data. The processor can output the display image for presentation on the display. In some examples, regions in the display image corresponding to regions considered to lack sufficient contrast to reliably observe the target gas within the region are presented in a visually distinguishable way from regions not considered to lack sufficient contrast to reliably observe the target gas within the region.

BRIEF DESCRIPTION OF THE DRAWINGS

FIG. 10 is an exemplary user interface showing user-selectable options for performing gas imaging operations.

FIG. 11 shows an exemplary lookup table for determining a required difference between the gas temperature and the apparent background temperature in order to achieve a certain minimum contrast due to a given gas type and gas amount.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
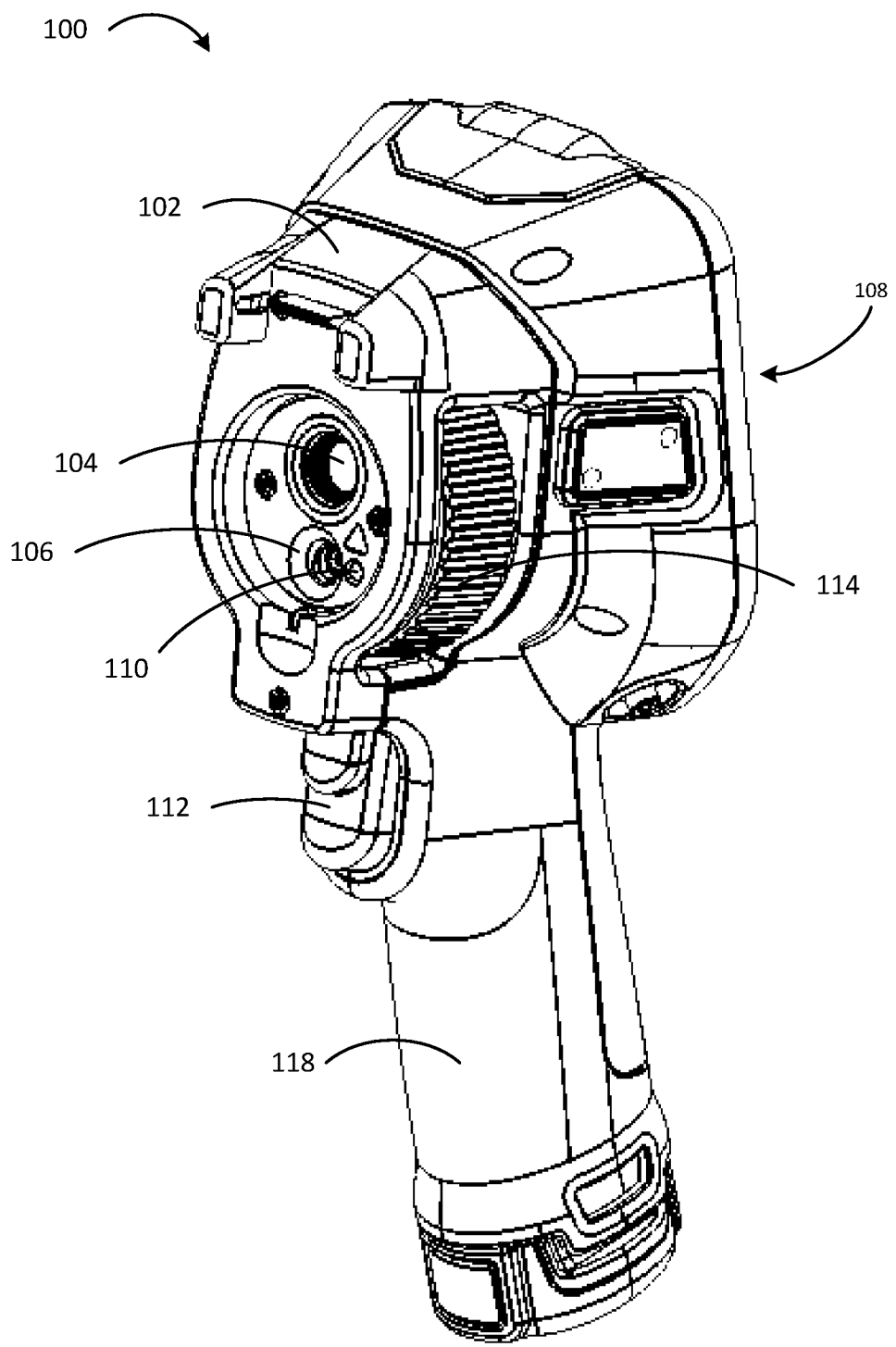
FIG. 1 is a perspective front view of an example thermal imaging camera.
Figure 2:
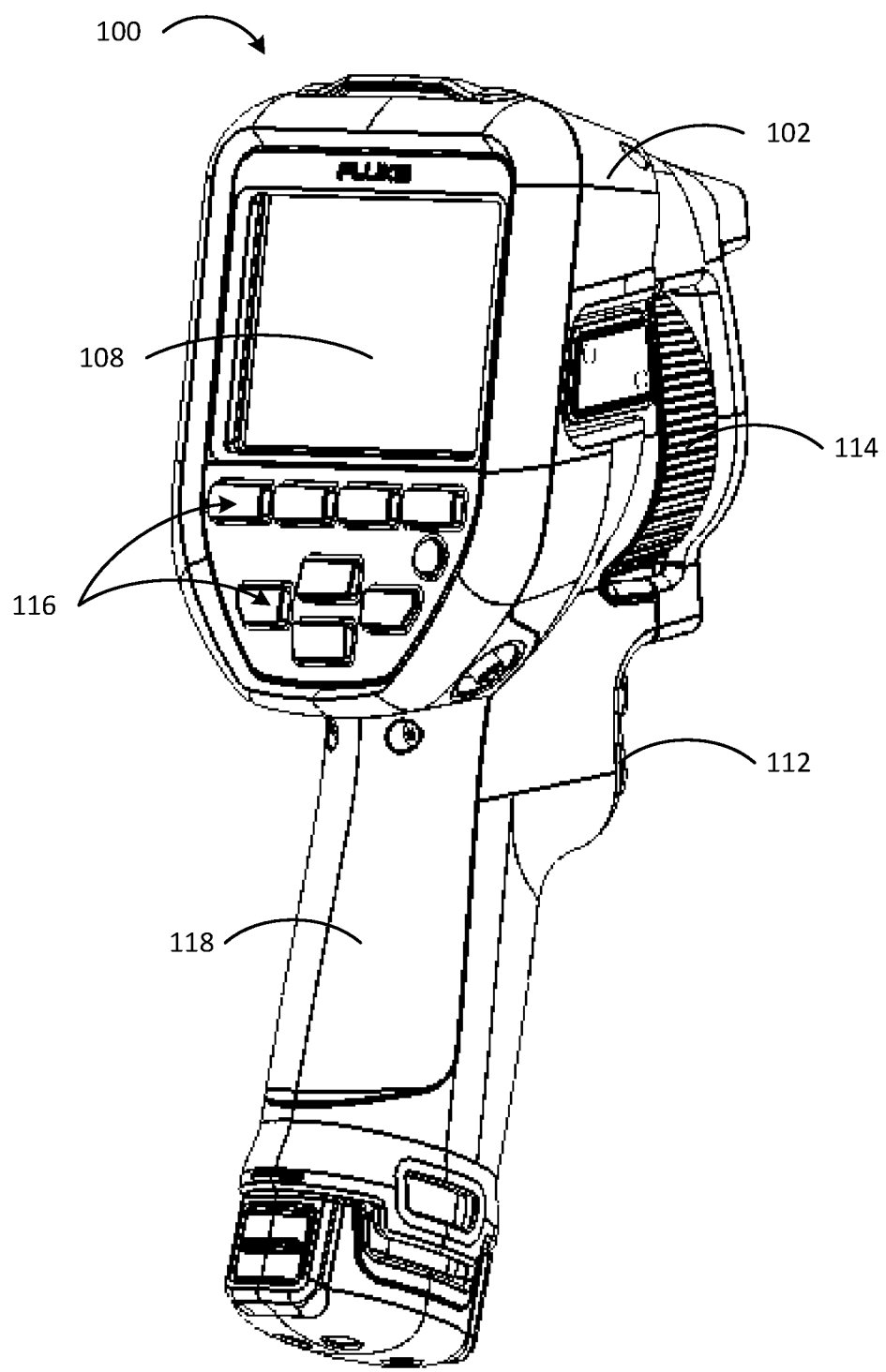
FIG. 2 is a perspective back view of the example thermal imaging camera of FIG. 1.

FIGS. 1 and 2 show front and back perspective views, respectively, of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle 118 for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera. Additionally or alternatively, the focus mechanism may move the FPA relative to one or more lenses of the infrared lens assembly.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series. In some examples, the infrared lens assembly 104 may include lenses having diffractive or reflective properties or elements. Additional optical components such as mirrors (e.g., Fresnel mirrors) and the like may be included within or otherwise proximate to the infrared lens assembly 104.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move one or both of the FPA and the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
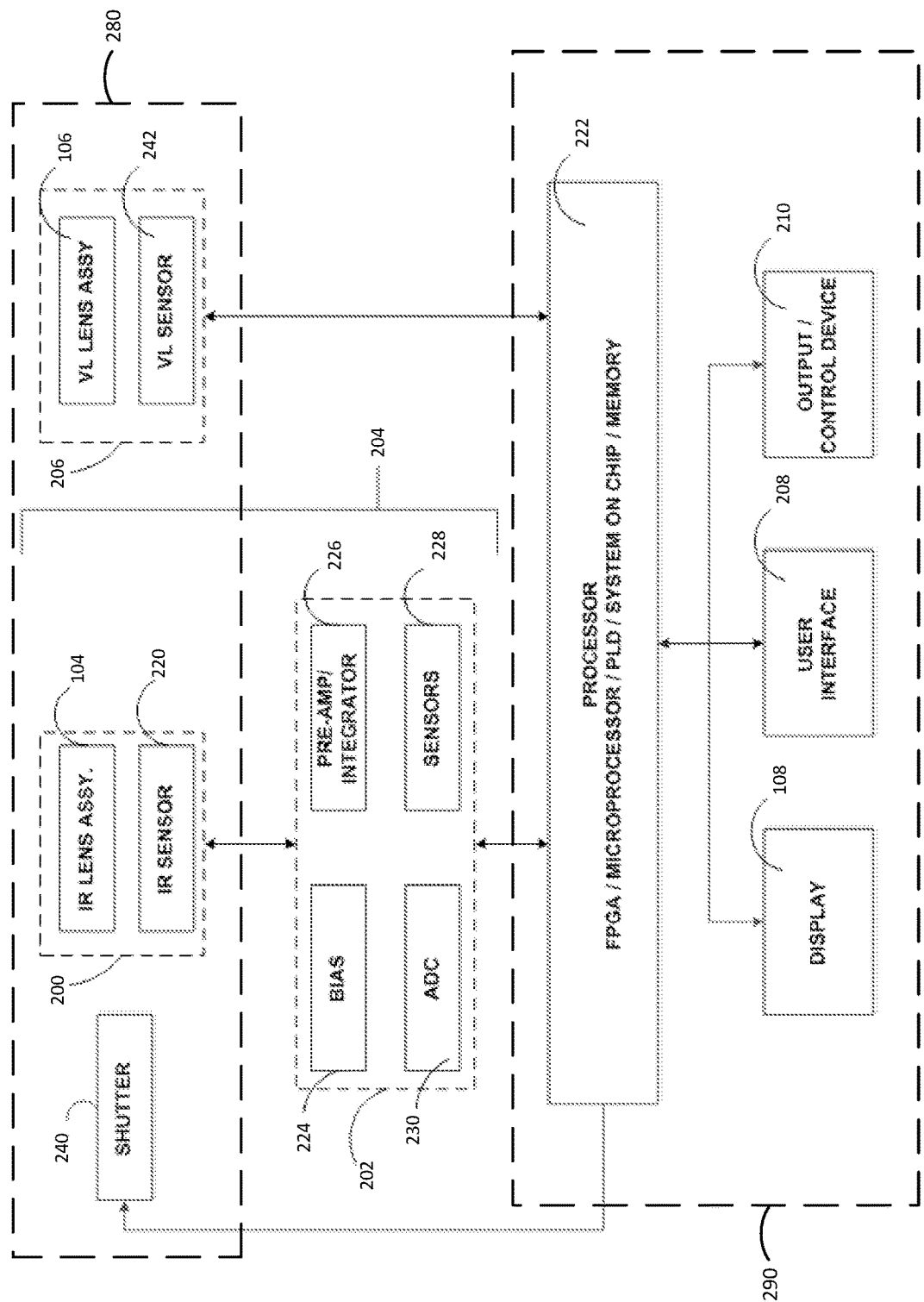
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates some or all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at substantially a given point in time. That is, in some examples, a plurality of pixels making up the infrared image may be captured simultaneously. In other embodiments, sets of one or more pixels may be captured serially until each pixel has been captured.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. In still other examples, a single sensor pixel may contribute to a plurality of display pixels. For example, a value from a single sensor pixel may be replicated at nearby pixels, such as in a simple upsampling procedure. In other examples, neighboring or otherwise nearby pixels may be averaged to create a new pixel value, such as in an interpolation procedure. Because relationships between display pixels and sensor pixels are defined with respect to camera operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108. In some examples, the visible light module 206 is configurable by a user, and can provide output, for example, to display 108, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200. In some examples, the visible light camera module 206 may include its own dedicated processor or other circuitry (e.g., ASIC) capable of operating the visible light camera module 206. In some such embodiments, the dedicated processor is in communication with processor 222 for providing visible light image data (e.g., RGB image data) to processor 222. In alternative embodiments, a dedicated processor for the visible light camera module 206 may be integrated into processor 222.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

In some embodiments, one or both of infrared 200 and visible light 206 camera modules for acquiring IR and VL image data may be included in an image acquisition module 280. The image acquisition module may be in wired or wireless communication with a processing module 290 that includes a processor such as 222. Processing module 290 may receive image data from the image acquisition module 280 and perform subsequent processing steps as will be described herein. In some examples, processing module 290 may include portable processing devices, such as a smartphone, a tablet, a stand-alone computer such as a laptop or desktop PC, or the like. In some such embodiments, various components of front end circuitry 202 may be included in the image acquisition module 280, the processing module 290, or both.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. In various embodiments, the size and/or resolution of the IR and VL images need not be the same. Accordingly, there may exist a set of pixels in one of the IR or VL images that correspond to a single pixel in the other of the IR or VL image, or a set of pixels of a different size. Similarly, there may exist a pixel in one of the VL or IR images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or downsampling one of the images, or combining a pixel with the average value of a corresponding set of pixels. Other examples are known and are within the scope of this disclosure.

Thus, corresponding pixels need not have a direct one-to-one relationship. Rather, in some embodiments, a single infrared pixel has a plurality of corresponding visible light pixels, or a visible light pixel has a plurality of corresponding infrared pixels. Additionally or alternatively, in some embodiments, not all visible light pixels have corresponding infrared pixels, or vice versa. Such embodiments may be indicative of, for example, a picture-in-picture type display as previously discussed. Thus, a visible light pixel will not necessarily have the same pixel coordinate within the visible light image as does a corresponding infrared pixel. Accordingly, as used herein, corresponding pixels generally refers pixels from any image (e.g., a visible light image, an infrared image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the camera. Thus, in some embodiments, a blended image can be adjusted between 100 percent visible light and 100 percent infrared.

Additionally, in some embodiments, the processor 222 can interpret and execute commands from user interface 208, and/or output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale. In other examples, display 108 is configured to display an infrared image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 222. For example, processor 222 may generate values (e.g., RGB values, grayscale values, or other display options) for each pixel to be displayed. Display 108 may receive such information and map each pixel into a visual display.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

Figure 4A:
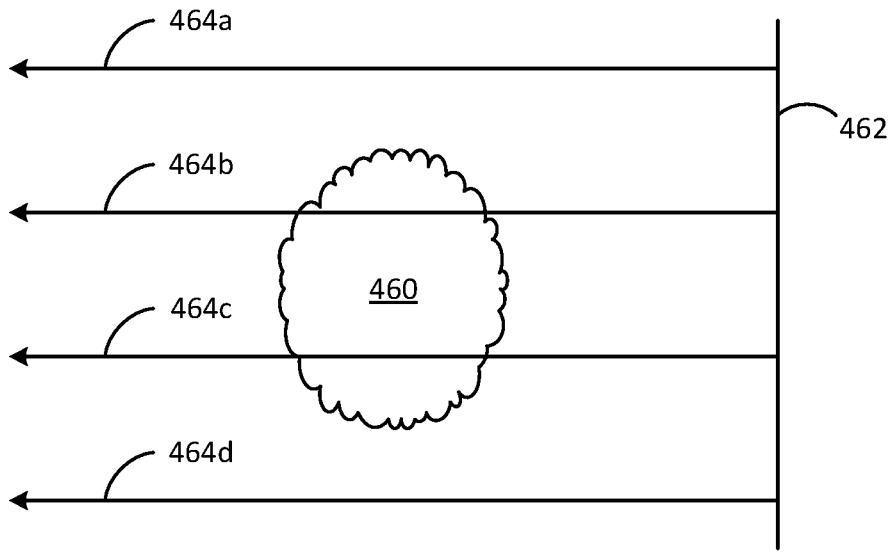
FIGS. 4A and 4B show schematic illustrations of a gas impacting a thermal image.
Figure 4B:
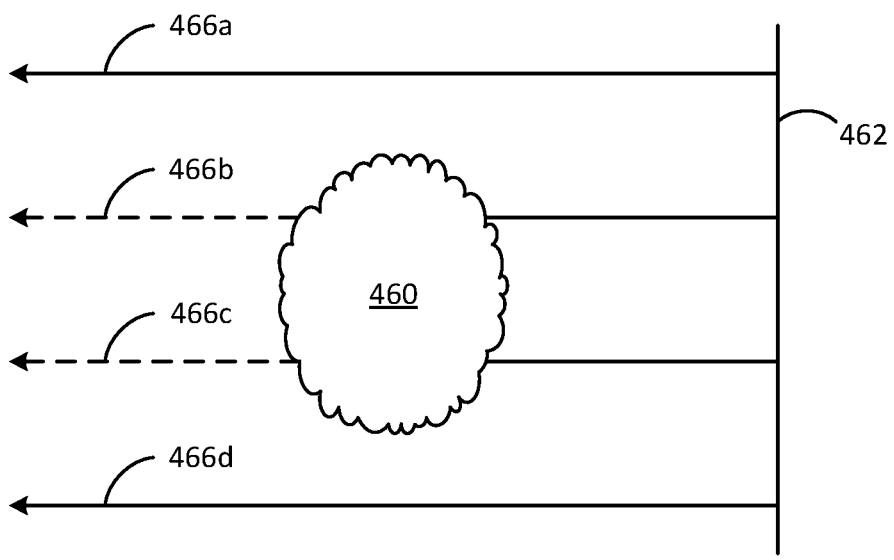

In some cases, thermal imaging cameras can be used for detecting the presence of infrared-absorbing gases in a scene. FIGS. 4A and 4B show schematic illustrations of a gas impacting a thermal image. FIG. 4A shows a gas cloud 460 and a source 462 of infrared radiation. Beams 464a-464d represent infrared radiation from source 462 at a wavelength of light that is not substantially absorbed by the gas in gas cloud 460. FIG. 4B similarly shows a gas cloud 460 and a source 462 of infrared radiation. Beams 466a-466d represent infrared radiation from source 462 at a wavelength of light that is absorbed by the gas in gas cloud 460. As shown in the illustrative example of FIG. 4B using broken lines, after passing through gas cloud 460, the beams 466b and 466c are attenuated by absorption by the gas while beams 466a and 466d, which do not pass through gas cloud 460, are unaffected. It will be appreciated that, while described as radiation being "attenuated" by a gas cloud (e.g., 460), in some instances, the gas cloud can augment radiation of a certain wavelength. For example, in an environment in which a gas is at a higher temperature than the background scene, the gas can add to (augment) radiation at one or more wavelengths with respect to the background scene rather than attenuate such wavelengths.

Figure 5A:
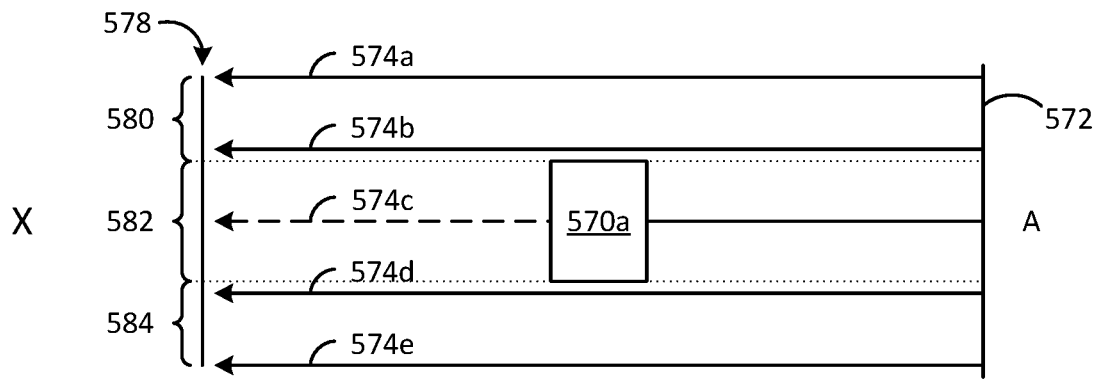
FIGS. 5A-5C schematically show how infrared imaging can detect the presence of gas in a target scene.
Figure 5B:
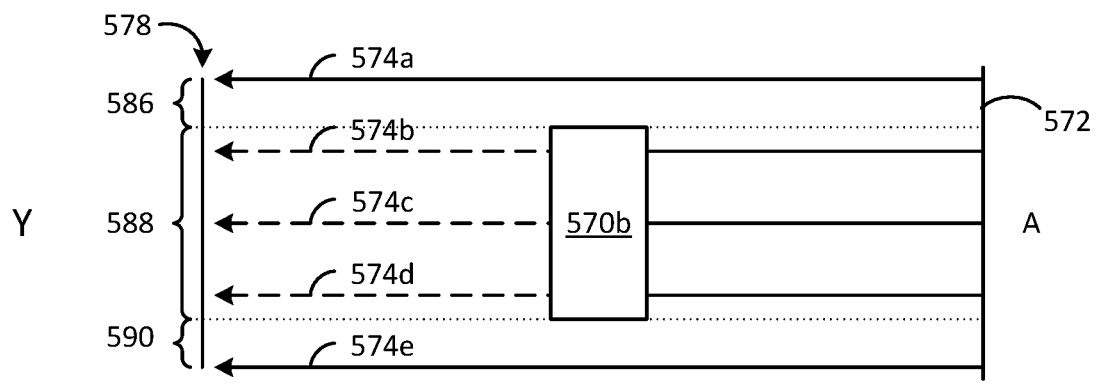
Figure 5C:
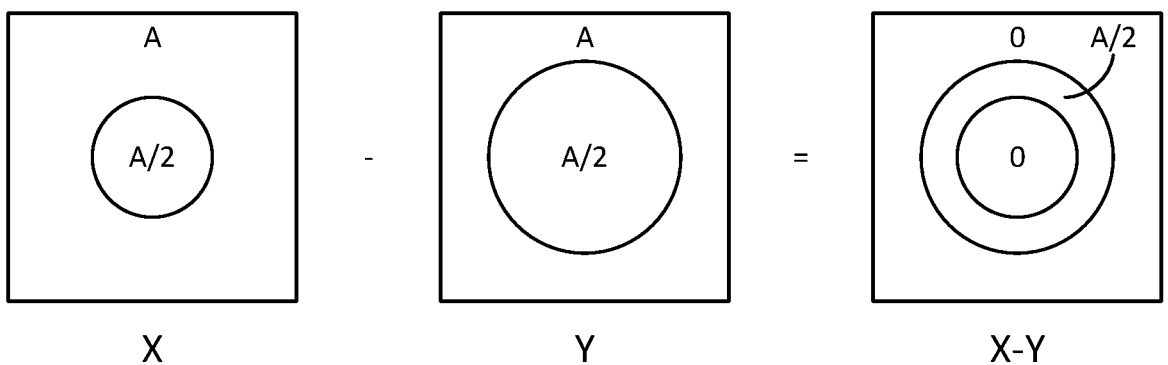

FIGS. 5A-5C schematically show how infrared imaging can detect the presence of gas in a target scene. FIG. 5A shows a source 572 of infrared radiation emitting at a particular wavelength and having uniform amplitude A. Beams 574a, 574b, 574d, and 574e of infrared radiation do not pass through gas cloud 570a, while beam 574c passes through gas cloud 570a. In the illustrated example, the gas cloud 570a attenuates the wavelength by a factor of 5. Thus, at plane 578, the amount of radiation received at regions 580 and 584 emitted by source 572 will still have amplitude A, while the amount of radiation received at region 582 will have amplitude A/2, since the radiation was attenuated by gas cloud 570a. An infrared image X taken at plane 578 would include regions (580, 584) having amplitude A and other regions (582) with amplitude A/2.

FIG. 5B similarly shows a source 572 of infrared radiation emitting at a particular wavelength and having uniform amplitude A, however the gas cloud 570b in FIG. 5B is larger than that in FIG. 5A (e.g., due to the gas expanding). In this case, beams 574a and 574e of infrared radiation do not pass through gas cloud 570b, while beams 574b-574d pass through gas cloud 570b. Since the gas cloud 570b attenuates the wavelength from the source 572 by a factor of 2, the amount of radiation received at regions 586 and 591 will still have amplitude A, while the amount of radiation received at region 588 will have amplitude A/2. An infrared image Y taken at plane 578 would include regions (586, 590) having amplitude A and other regions (588) with amplitude A/2.

If source 572 emitted only the wavelength attenuated by the gas cloud (570a, 570b) at uniform amplitude A, either image X (FIG. 5A) or Y (FIG. 5B) would show the presence of the gas cloud, due to the difference in radiation received at plane 578. For example, FIG. 5C shows image X having a region with amplitude A and a region attenuated by gas cloud 570a having amplitude A/2. Similarly, image Y includes a region with amplitude A and a region attenuated by gas cloud 570b having amplitude A/2. However, if the source 572 emits additional infrared radiation, such as a typical blackbody, attenuation (or augmentation) of a single wavelength or narrow waveband within the image data would not necessarily be apparent in either image X or Y alone. That is, the attenuation or augmentation of the radiation wavelength(s) would not necessarily produce a noticeable amount of contrast in the image, since the attenuation or augmentation of a small waveband due to the gas may be small compared to the overall radiation amplitude in the image. Thus, in a general gas imaging process, a gas cloud can generally affect the radiation of a wavelength or band of wavelengths due received from a target scene due to attenuation or augmentation of the radiation.

However, a difference image X-Y taken by subtracting one image from the other will eliminate any constant background data not attenuated by the gas cloud (570a, 570b). In such an image, the region attenuated by the gas cloud in one image (Y) but not in the other image (X) will appear as a non-zero region (in this case, A/2) in the difference image X-Y, thus indicating at least the presence of gas in the scene. Thus, in some instances, such a difference image can comprise an optical gas image, which can be used to identify a current state of a gas cloud. That is, in some instances, an optical gas image can be generated by determining the difference between a current scene (a "foreground" image) showing the effect of a current gas and a historical scene (a "background" image) showing image data reflecting a previous effect of the gas. With a stationary camera, fixed components in the scene (e.g., non-gas) are likely to be substantially the same in the foreground image and the background, but the gas cloud will have likely evolved and/or moved. Thus, the optical gas image, being generated using the difference between the foreground image and the background image, will include regions in which impact of the gas on the received radiation (e.g., attenuation or augmentation) has changed between the images, but contribution from the fixed components will be absent, since such contribution is present in both the foreground and background image.

It will be appreciated that the example described with respect to FIGS. 5A-5C is a simplified example illustrating the concept of gas imaging using the absorption properties of the gas relative to at least one infrared wavelength. However, in various examples, the impact on the received radiation by a gas cloud will depend on the size (e.g., path thickness) and density of the gas cloud, neither of which is necessarily constant throughout a gas cloud. Thus, the degree and shape of the attenuation or augmentation from a gas cloud can vary within a scene as the gas cloud changes shape over time.

One common way to achieve a gas-detection image is to generally perform the step illustrated in FIG. 5C, in which an image taken at one time (the foreground image) is subtracted from an image taken at an earlier time (the background image). The difference in the image will be representative of any changes in the target scene, and since a gas cloud is constantly changing, the gas cloud appears in the image. One way this image subtraction can be performed is by subtracting two images from within a scene buffer, for example, subtracting the earliest image in a buffer from the most-recently acquired image in the buffer. It will be appreciated that the relative amount of emission and attenuation with respect to the amplitude A of the source 572 are arbitrary and used for ease of explanation. Often, the amount of attenuation and/or emission of infrared radiation due to the presence of gas will be very small compared to the magnitude of the infrared radiation emitted from the background (e.g., source 572), making it generally difficult to image gas using standard imaging techniques, for example, viewing infrared image data without performing additional processing, such as by performing a subtraction process as generally shown in FIG. 5C.

Figure 6:
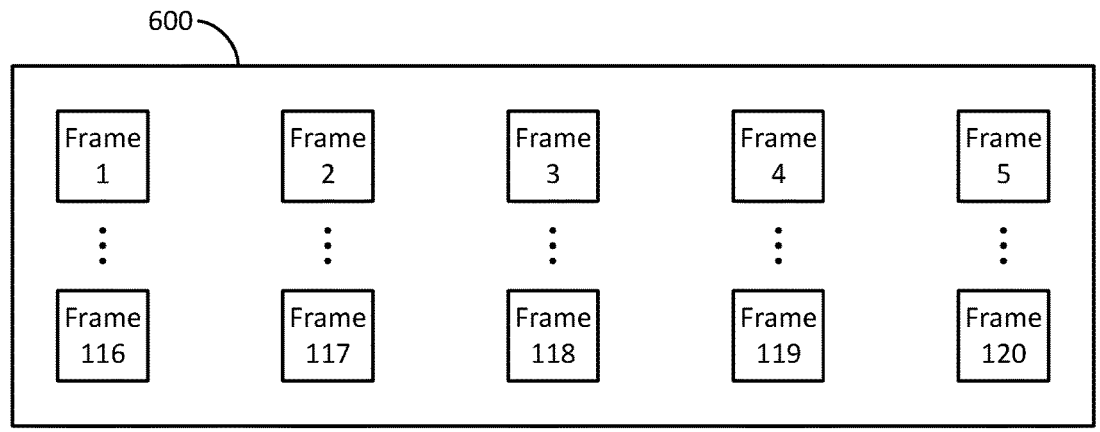
FIG. 6 is a schematic illustration of a plurality of image frames captured in a frame buffer.

FIG. 6 is a schematic illustration of a plurality of image frames captured in a frame buffer. As shown, 120 images (Frame 1-Frame 120) are present in the frame buffer 600. In an exemplary embodiment, the 120 images in FIG. 6 can represent 120 frames in a two second buffer acquired at a framerate of 60 Hz. In such an example, Frame 120 is taken approximately two seconds after Frame 1. Thus, subtracting Frame 1 (the historical, "background" image) from Frame 120 (the more recent, "foreground" image) would yield an optical gas image showing changes in the scene over approximately a two second timeframe, which could show the presence of an evolving gas cloud within the target scene. Each time a frame in the buffer 600 is replaced (e.g., Frame 1 is replaced with Frame 121), the first and last frames (now Frame 2 and Frame 121) can be compared to generate a new optical gas image. Thus, the optical gas image can be updated at the same framerate as the images are acquired.

As described, the effect of a gas cloud on the infrared radiation from a scene that reaches an imaging plane in a thermal camera is dependent on several features, such as the amount and density of the gas. Additionally, a typical target scene will emit a broad span of infrared wavelengths, some of which will be absorbed or emitted by a gas to a greater degree than others, and the impact on received radiation due to the gas may be very small. As a result, the changes in an image due to the presence of or changes in a gas cloud may be below the noise threshold of a thermal camera. That is, without a sufficiently high signal to noise ratio in a thermal camera, noise (e.g., due to sensor/electronics drift, thermal fluctuations, component self-heating or other factors) may obscure subtle changes in the image due to gas, making gas recognition impossible or impractical.

Accordingly, reducing the noise in the infrared images used to observe and/or detect gas can increase the ability to resolve gas from noise in the thermal scene. Some ways of reducing noise in the scene include using a high-sensitivity camera sensor or FPA, such as in a cryo-cooled infrared camera. However, such equipment can be costly and difficult or inconvenient to use. For example, such equipment can be bulky, difficult to carry and/or maneuver, can require extended operating time (e.g., cool down times), and the like.

Other techniques to improve the signal to noise ratio of the image data used in establishing a gas image includes generating averages of the image data to reduce the noise present in the foreground and/or background images. For instance, in an exemplary embodiment, with reference to FIG. 6, images 1-5 can be averaged together to create a filtered background image, while images 116-120 can be averaged to create a filtered foreground image. This generally reduces the noise in the foreground and background images by a factor of $\sqrt{5}$ (the square root of the number of averaged frames). The difference between the filtered foreground image and the filtered background image would represent changes in the scene (e.g., in the size, density, etc. of a gas cloud) with reduced noise, such that smaller changes in the scene can be observed due to reduced noise.

In general, any of a variety of averaging and/or filtering techniques can be employed to reduce the noise in the foreground and background images used to create an optical gas image. In some embodiments, as described above, the filtered foreground image can be generated from an average of a first plurality of frames while the filtered background image can be generated from an average of a second plurality of frames. In some such examples, the first plurality of frames and the second plurality of frames can be entirely distinct from one another (e.g., Frames 1-5 and Frames 120 as described above). In other examples, the first plurality of frames and the second plurality of frames at least partially overlap. In some embodiments, the median frame in the first plurality of images is captured at a more recent time than the median frame in the second plurality of images. Thus, the filtered foreground image will be generally representative of a more recent point in time than the filtered background image.

In some examples, the filtered foreground and/or filtered background images are calculated using a traditional average taken across the first and second plurality of frames, respectively. If performing a traditional average of a plurality of frames, then the first plurality of images and the second plurality of images cannot be the same plurality of images, since otherwise subtracting the filtered foreground image and filtered background image would result in a blank image.

In other examples, averaging a plurality of frames can include performing a weighted average of the plurality of frames. For example, in calculating an average of a plurality of frames, greater weight can be placed on more recent frames, less recent frames, or based on any of a variety of parameters. Such weighted averaging can be performed on first and second pluralities of frames in order to generate a filtered foreground and background image, respectively. In some examples, when using a weighted average, the first and second plurality of images can be the same plurality of images. For example, in some embodiments, the filtered background image can be calculated from a weighted average of a plurality of frames wherein frames captured earlier are weighted more heavily than are frames that were captured at a later time. Similarly, the filtered foreground image can be calculated from a weighted average of the same plurality of frames wherein frames that were captured later in time are weighted more heavily than are frames that were captured earlier in time. Thus, the filtered background image generally represents an averaged target scene at an earlier time than does the filtered foreground image.

Equations (1) and (2) show a simplified technique for performing a weighted average on a single plurality of N images to calculate a filtered foreground image and a filtered background image. For example, with respect to Equations (1) and (2) a plurality of images includes N frames $F_1, F_2, \ldots, F_N$, wherein image $F_1$ is the frame in the plurality that was captured at the earliest time and frame $F_N$ is the frame captured at the most recent point in time.

$$F_{background} \propto \sum_{n=1}^{N}\left(\frac{1}{n}\right)F_n \qquad (1)$$

$$F_{foreground} \propto \sum_{n=1}^{N}\left(\frac{1}{N-n+1}\right)F_n \qquad (2)$$

As shown, according to Equation (1), in calculating the filtered background image $F_{background}$, earlier images contribute to the average much more than the later images. Similarly, according to Equation (2), in calculating the filtered foreground image, $F_{foreground}$, later images contribute to the average much more than the earlier images. Equations (1) and (2) illustrate one exemplary process of how images captured at different times can be weighted differently in generating filtered foreground and background images. It will be appreciated that many possible forms of averaging are possible in order to generally average a single plurality of images using different weighting techniques to generate different foreground and background images. Exemplary processes for combining a plurality of buffer frames to generate filtered foreground and background images can include applying one or more finite impulse response (FIR) filters to a plurality of images within the buffer.

With respect to FIG. 6, in some examples, all frames in a buffer 600 can be averaged together to create foreground and background images for use in an optical gas imaging process. For example, Frames 1-120 can be averaged together via a first averaging technique, such as using Equation (1), to calculate a filtered background image. Similarly, Frames 1-120 can be averaged together via a second averaging technique, such as using Equation (2), to calculate a filtered foreground image. As described elsewhere herein, an optical gas image can be calculated by comparing the filtered foreground and background images, such as via subtraction $F_{foreground} - F_{background}$, and displayed. The optical gas image can show a representation of a gas cloud as it changes over time in the target scene as described elsewhere herein.

In some examples, processing frames from a frame buffer may require an undesired amount of memory and/or processing capability in order to adequately perform certain imaging techniques. For example, in the exemplary embodiment described with respect to FIG. 6, to process and display an essentially "real-time" optical gas image to illustrate the presence of gas in a target scene, a camera requires memory to include 120 frames in a buffer 600. Such a camera would also require sufficient processing power to perform calculations including up to all 120 frames twice in order to calculate both the filtered foreground and filtered background images fast enough to continually calculate and present optical gas images to show a substantially "real-time" updating image. Such requirements can increase the cost and complexity of a camera.

Figure 7:
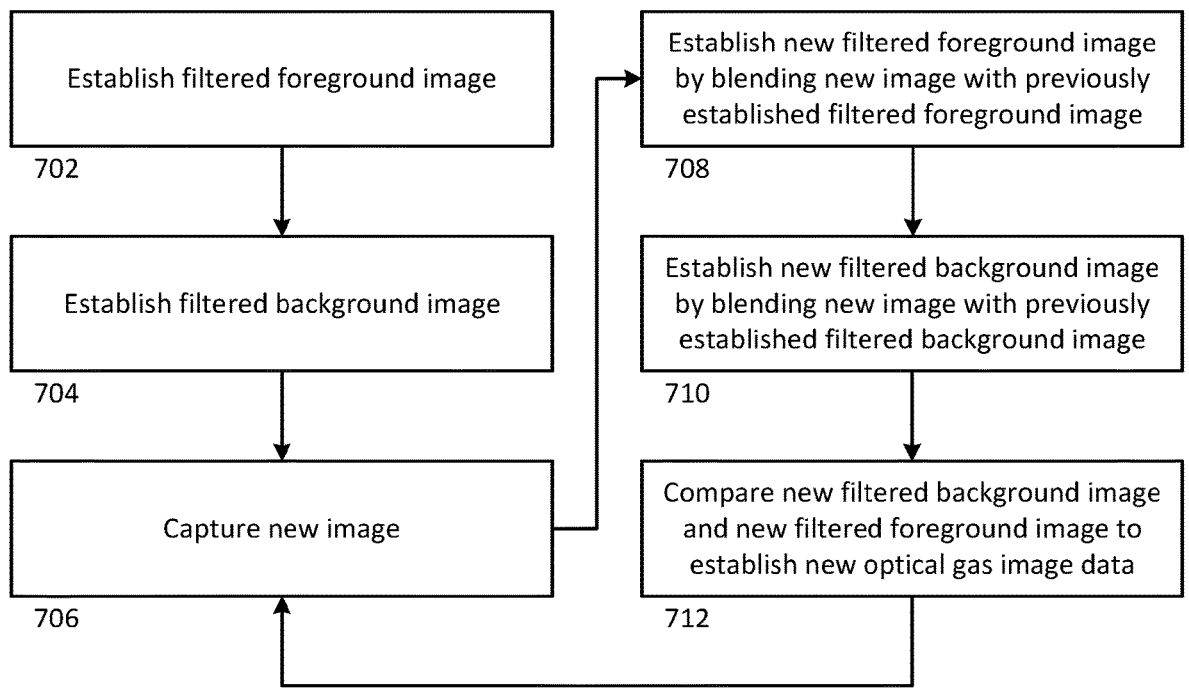
FIG. 7 is a process flow diagram illustrating an exemplary process for generating and updating filtered foreground and background for continued updating of an optical gas image.

In some embodiments, alternative techniques can be performed for determining filtered background and foreground images for calculating an optical gas image that can be used to identify a gas cloud in an imaged scene. FIG. 7 is a process flow diagram illustrating an exemplary process for generating and updating filtered foreground and background images for continued updating of an optical gas image. The process includes the steps of establishing a filtered foreground image (702) and establishing a filtered background image (704). This can include, for example, capturing a single frame and calling the frame both the filtered foreground image and the filtered background image. In other examples, a first image can be captured and established as the filtered background frame and a second image can subsequently be captured and established as the filtered foreground frame. In either case, after each of the filtered foreground image (702) and filtered background (704) images are established, as each image is updated via the process of FIG. 7, non-zero differences will generally be present between the filtered foreground and background images during subsequent iterations of the method of FIG. 7.

At this point, two images are stored in memory—a filtered foreground image and a filtered background image. Next, a new image is captured (706). The process includes the steps of establishing a new filtered foreground image by blending the new image captured at step 706 with the previously established filtered foreground image (708). Similarly, the method includes the step of establishing a new filtered background image by blending the new image captured at step 706 with the previously established filtered background image (710). Steps 708 and 710 effectively average the new frame with previous data acting to update each of the filtered foreground and background images by incorporating new image data while maintaining the noise-reduction benefits of filtering/averaging the images.

According to the method of FIG. 7, the new filtered foreground image (from step 708) and the new filtered background image (from step 710) are compared to establish a new optical gas image (712). As described elsewhere herein, comparing the foreground and background images can include subtracting one image from the other. Generally, since changes in the image data are what ultimately represent gas in the image, the optical gas image can be calculated by determining the absolute value of the difference between the background and foreground images or by subtracting either of the foreground image and the background image from the other.

After establishing a new optical gas image (712), a new image is captured (706). The new image is blended with the previously established filtered foreground image (from the previous iteration through the method) to establish yet another new filtered foreground image (708). Similarly, the new image is blended with the previously established filtered background image (from the previous iteration through the method) to establish yet another new filtered background image (710). The new foreground and background images can be compared to establish yet another new optical gas image (712).

In some examples, steps in the process of FIG. 7 can be performed sequentially, such as establishing initial and new filtered foreground and background images. In other examples, some such steps can be performed in parallel. For example, in some embodiments, filtered foreground and filtered background images can be processed and updated in parallel with one another. In an exemplary embodiment, steps 702 and 704 are performed in parallel. Additionally or alternatively, steps 708 and 710 are performed in parallel. In some such examples, filtered foreground and filtered background images can be generated and updated in parallel before being compared to establish new optical gas image data (712).

In some examples, blending the new image with a previous background or foreground image to recursively update the filtered background and/or foreground image can be performed using one or more infinite impulse response (IIR)

filters. In some such examples, the new image and the previous image are weighted by a scaling factor and combined. Equations 3 and 4 provide exemplary calculations for blending a new image with previous foreground and background images to calculate new foreground and background images, respectively, according to an exemplary first order IIR filter.

$$F_{foreground} = (\alpha_{foreground}) \times (F_{new}) + (\beta_{foreground}) \times (F_{prev\_foreground}) \quad (3)$$

$$F_{background} = (\alpha_{background}) \times (F_{new}) + (\beta_{background}) \times (F_{prev\_background}) \quad (4)$$

wherein $\alpha_{foreground} + \beta_{foreground} = 1$ and $\alpha_{background} + \beta_{background} = 1$ As shown in Equation 3, the updated foreground image, $F_{foreground}$, is a blend of a new image, $F_{new}$, and a previous foreground image, $F_{prev\_foreground}$. The new image is scaled by a factor of $\alpha_{foreground}$, while the previous foreground image is scaled by a factor of $\beta_{foreground}$. Similarly, the updated background image, $F_{background}$, is a blend of the new image, $F_{new}$, and a previous background image, $F_{prev\_background}$. The new image is scaled by a factor of $\alpha_{background}$, while the previous background image is scaled by a factor of $\beta_{background}$.

It will be appreciated that, while referred to as an infinite impulse response filter, in some examples, due to the limited calculation accuracy (e.g., in digital processing), a contribution from a previous image after several iterations of the filter may amount to zero in a digital filtering process. That is, if a value become sufficiently small compared to the calculation precision, the value may effectively become to zero due to processing limitations. Thus, in some embodiments, an image taken during an IIR filtering process may not in practice contribute to a filtered background or foreground image after a sufficiently high number of iterations of the IIR filter. However, as used herein, an infinite impulse response (IIR) filter will also encompass such filters in which such values may become zero beyond a certain number of iterations due to calculation precision limitations, but conceptually would not necessarily become exactly zero with infinite calculation accuracy.

Figure 8:
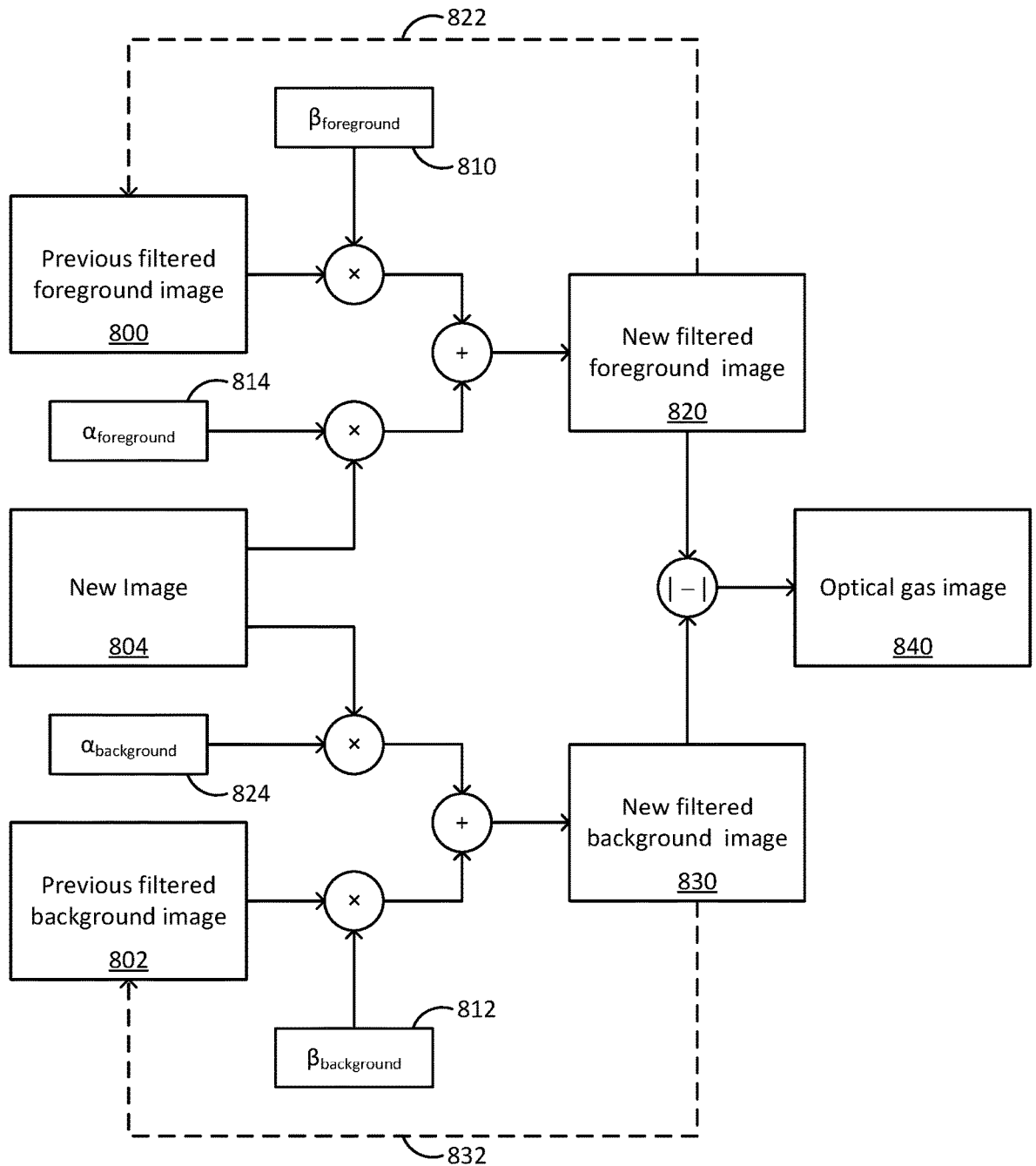
FIG. 8 is a schematic illustration of a process for generating an optical gas image.

FIG. 8 is a schematic illustration of a process for generating an optical gas image using Equations 3 and 4. As shown, a new image 804 is alpha-blended with a previous filtered foreground image 800 using scaling factors $\alpha_{foreground}$ and $\beta_{foreground}$ to create a new filtered foreground image 820. Similarly, the new image 804 is alpha-blended with a previous filtered background image 802 using scaling factors $\alpha_{background}$ and $\beta_{background}$ to create a new filtered background image 830. The new filtered foreground image 820 and new filtered background image 830 can be compared (shown in FIG. 8 as the absolute value of the difference between the images) to establish an optical gas image 840.

As indicated by arrows 822 and 832, respectively, the new filtered foreground image 820 becomes the previous filtered foreground image 800 and the new filtered background image 830 becomes the previous filtered background image 802 for subsequent iterations of optical gas imaging 840. That is, as described with respect to the repetitive method of FIG. 7, in some embodiments, after generating an optical gas image 840, another new image 804 is captured and blended with the previously used foreground and background images to generate updated foreground and background images, which are then used to generate a new optical gas image.

As described elsewhere herein, the same averaging process should not be used to determine both the foreground image and the background image, since otherwise, subtracting one image from the other would result in a blank frame. Accordingly, with respect to Equations 3 and 4, $\alpha_{foreground} \neq \alpha_{background}$ and $\beta_{foreground} \neq \beta_{background}$. This ensures that the background and foreground images are not necessarily the same. Similarly, when using, for example, higher order IIR filters, having at least one filtering parameter different between the foreground and background filtering techniques results in a difference image that is not constantly zero.

In still further examples, different filters altogether can be used on the foreground image stream and the background image stream to ensure the foreground and background filtering process does not result in a constantly zero difference image. For example, in some embodiments, the filtered background image can be determined using one of a first order IIR filter, a higher order IIR filter, or a FIR filter, while the filtered background image can be determined using different one of the first order IIR filter, higher order IIR filter, or FIR filter.

With further reference to Equations 3 and 4, it is evident that the amount of contribution to a new image from the historical images increases with the β value. That is, a larger β value (and accordingly, a smaller α value) corresponds to an image giving greater weight to the previous image (e.g., 800 or 802 in FIG. 8) than the newly acquired image (e.g., 804). Accordingly, in some embodiments, $\beta_{background} > \beta_{foreground}$ so that the background image is generally weighted more strongly toward historical image data while the foreground image is weighted more strongly toward the current image.

Further, as the process is repeated and the foreground and background images are updated more and more times, the effect of the different blending ratios will compound, establishing a difference in time represented by the foreground and background images.

Another way of interpreting the foreground and background images as they evolve over time is in view of a time constant. Generally, for a given α or β value, the filtered foreground and background images will have contributions from several "new" images that are successively captured over time. However, the number of images that significantly contribute (e.g., a threshold percentage) to the filtered foreground and background images at a given time will be a function of α and β. Further, if the images are captured at a particular frame rate, the number of images that contribute is analogous to a time span during which the images that significantly contribute were captured. That is, for a given α and β blending ratio, there will be an amount of time, τ, before which acquired images no longer significantly contribute to the filtered image. This can be referred to as the time constant associated with the given α and β.

Accordingly, the filtered background image will have a time constant, $\tau_{background}$, such that images captured at a time earlier than $\tau_{background}$ prior to the new captured image will not significantly contribute to the background image. Similarly, the filtered foreground image will have a time constant, $\tau_{foreground}$, such that images captured at a time earlier than $\tau_{foreground}$ prior to the new captured image will not significantly contribute to the foreground image. It will be appreciated that images that do not significantly contribute to the updated images necessarily have no contribution. In some cases, the iteratively updated background and foreground images will include contributions from images captured at more than the time constant earlier than the newly captured image, however, this contribution will be relatively small compared to the overall image (e.g., less than a factor of 1/e, etc.). According to this interpretation, the time constant of the continually updated background image, $\tau_{background}$, will be larger than the time constant of the continually updated foreground image, $\tau_{foreground}$ ($\tau_{background} > \tau_{foreground}$). Thus, the background image generally incorporates images taken over a greater period of time than does the foreground image. Additionally, since a longer time constant (larger $\tau$ and $\beta$) generally incorporates larger contributions of image data from over a longer period of time, a larger time constant generally amounts to more filtering and noise reduction in the filtered image.

In some examples, with respect to Equations 3 and 4, the contribution from a given image will contribute a factor of less than 1/e to the final image after approximately $1/\alpha$ frames have been added into the filtered image after the given image was added. That is, if $\alpha=0.1$, then the filtered image will be updated 10 times with newly captured images before a previous image contributes less than a factor of 1/e to the filtered image. If the 1/e threshold is used as determining the time constant, then the time constant can be determined based on the framerate and the value of a according to Equation 5.

$$\tau \approx \frac{1}{\alpha \times framerate} \quad (5)$$

In an exemplary embodiment:
$\beta_{foreground} = 0.9$
$\alpha_{foreground} = 0.1$
$\beta_{background} = 0.99$
$\alpha_{background} = 0.01$
Using Equation 5 and a framerate of 60 Hz,
$\tau_{foreground} \approx 0.17$ seconds
$\tau_{background} \approx 1.67$ seconds Thus, in such an exemplary embodiment, the filtered foreground image is approximately a weighted average of the previous 10 frames captured over the previous 0.17 seconds while the filtered background image is approximately a weighted average of the previous 100 frames captured over the previous 1.67 seconds. The difference between the filtered foreground and filtered background images can be determined to calculate an optical gas image of the scene. It will be appreciated that images captured earlier than one time constant prior to the most recent image will still have minor contribution to the filtered image. The contributions from such images will continue to decrease after more time passes, such as after two, three, or more time constants. For example, the contribution of an image after three time constants is approximately 5%.

In some embodiments, filter parameters such as $\alpha$, $\beta$, $\tau$, or other higher order IIR filter parameters or FIR filter parameters are applied to the entire image. In other examples, such filter parameters can be applied on a region-by-region or pixel-by-pixel basis within an image. For example, in some embodiments, some pixels of a filtered background image are combined with corresponding pixels in a new image based on a first set of filter parameters, while other pixels of the same filtered background image are combined with corresponding pixels in a new image based on a second set of filter parameters different from the first.

The process described with respect to FIGS. 7 and 8 can be repeated, for example, at the image acquisition framerate of a camera (e.g., 30 Hz, 60 Hz, etc.). Each time a new image is captured, it can be blended with previously established foreground and background images to create an updated filtered image with reduced noise and updated content. The new images can be used to generate updated optical gas images at the same rate that images are captured by the camera.

Moreover, in some implementations of such a method, the memory of the camera does not require a buffer of many frames in order to create a filtered foreground image and a filtered background image with reduced noise and sufficiently different to create an optical gas image. In some examples, a camera can include three image streams—a background image stream that is repeatedly updated as new images are captured, a foreground image stream that is repeatedly updated as new images are captured, and an optical gas image stream that is repeatedly updated with the updated foreground and background images. Additionally, only a small amount of processing power is necessary to blend the new image with a previous background image and a previous foreground image to generate new background, foreground, and optical gas images. Thus, in some examples, employing the noise reduction process described in FIGS. 7 and 8 can reduce the demands for processing power, memory, and/or thermal resolution of a thermal imaging camera for performing adequate optical gas imaging processes.

As described elsewhere herein, subtracting foreground and background image data will reveal change in the image (e.g., an evolution of a gas cloud), and will subtract out parts of the image that remain constant. Thus, in some instances, an optical gas image showing gas in an otherwise stationary target scene may exclude important features in the image that are present in both the foreground and background images used to generate the optical gas image and are therefore subtracted out during the generation of the optical gas image. In some such examples, portions of the optical gas image showing an evolving gas cloud will be non-zero, while the rest of the scene, such as any stationary background, equipment, etc. will be approximately zero.

Thus, in some examples, the optical gas image can be combined with one or more additional image data streams in order to generate an image that both shows the presence of gas (e.g., from the optical gas image) and also provides context within the scene, such as from infrared and/or visible light image data. For example, in some embodiments, optical gas image data can be combined with visible light image data in order to illustrate the presence/location of gas in a target scene while retaining the scene context provided by visible light image data. Additionally or alternatively, infrared image data can be included to provide thermal information of the scene. In some examples, optical gas image data can be combined with combinations of infrared and visible light image data, such as described, for example, in U.S. Pat. No. 7,994,480, which is assigned to the assignee of the instant application and is hereby incorporated by reference. In various examples, combinations of optical gas image data and infrared and/or visible light image data can be performed using similar techniques as combinations of infrared and visible light image data, such as using alarm thresholds, picture-in-picture display modes, and the like.

Figure 9:
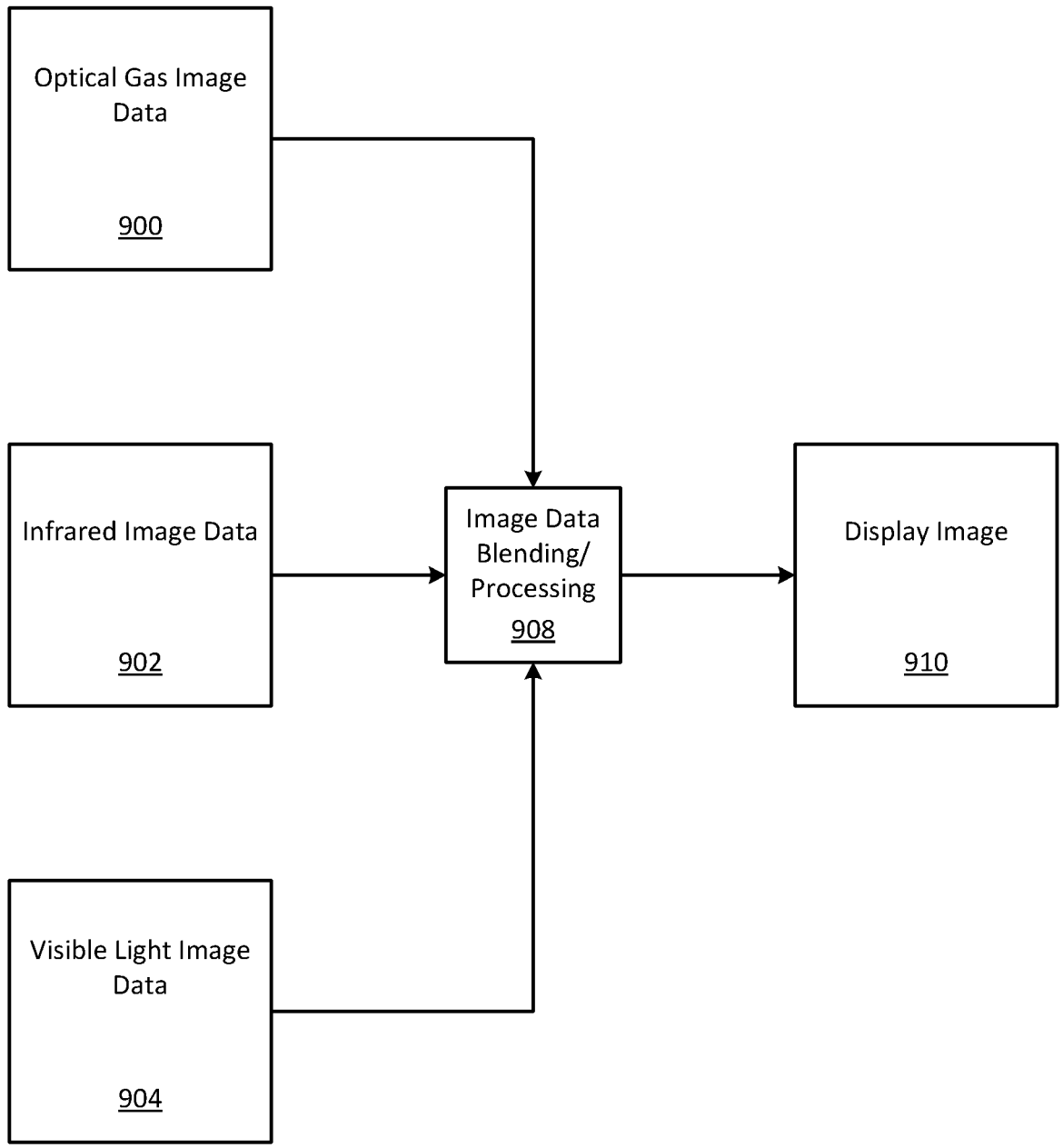
FIG. 9 is a schematic diagram illustrating combinations of image data that can be used to generate a display image.

FIG. 9 is a schematic diagram illustrating combinations of image data that can be used to generate a display image. In the illustrated example, optical gas image data 900, infrared image data 902, and visible light image data 904 are subject to image data blending/processing 908 to generate a display image 910. The image data blending and processing 908 can include a variety of functions, such as combining or overlaying data streams, palettizing/colorizing image data streams, and the like.

In some examples, data streams can be processed all at once, such as via a blend of image data. For example, the display image 910 can include a blend of optical gas image data 900, infrared image data 902, and visible light image data 904 according to Equation 6:

$$\text{Display} = \alpha \times OGI + \beta \times IR + \gamma \times VL; \; \alpha + \beta + \gamma = 1 \quad (6)$$

In other examples, optical gas image data 900 can be blended with and/or overlaid onto infrared image data 902, visible light image data 904, or a combination thereof. For example, as described elsewhere herein, infrared 902 and visible light 904 image data can be blended together, combined in a picture-in-picture format, or otherwise combined in a variety of ways. Such combined infrared image data 902 and visible light image data 904 can be subsequently combined with optical gas image data 900 for generating the display image 910. In some such examples, the optical gas image data 900 can be blended (e.g., alpha-blended) with the combined infrared 902 and visible light 904 image data. In other examples, the optical gas image data 900 can be overlaid on top of the combined infrared 902 and visible light 904 image data.

In some embodiments, the optical gas image data 900 is palettized according to a palettization scheme prior to combining the optical gas image data 900 with other image data streams such that the gas image data 900 is more easily visible in the display image 910. For example, in some embodiments, the optical gas image data 900 is palettized according to a palettization scheme that contrasts with the palettization scheme in which the infrared image data 902 is displayed so that the optical gas image data 900 can be readily seen. In other examples, $\beta$ in Equation 6 is set to zero, so that the optical gas image data is combined with the visible light image data. In some such examples, the optical gas image data can be palettized to contrast with the visible light image data. Additionally or alternatively, the optical gas image data 900 can be combined with some or all of the visible light image data, such as via a picture-in-picture mode. In various examples, the optical gas image data can be overlaid onto the visible light image data and/or blended with the visible light image data.

Additionally or alternatively, other image processing techniques on one or more image data streams can be performed. For example, edge enhancement techniques can be employed in order to emphasize the edges of objects and/or a gas cloud in the image data, such as described in U.S. patent application Ser. No. 14/837,757 or 14/222,153, each of which is assigned to the assignee of the instant application and is hereby incorporated by reference. Other image processing techniques can include determining and displaying information regarding the likelihood of observing a gas cloud in a target scene using certain gas detection techniques, such as described in U.S. Pat. No. 9,464,984, which is assigned to the assignee of the instant application and is hereby incorporated by reference.

In some examples, a thermal imaging camera can show a real-time optical gas image on a display so that a user may observe the evolution of the gas in the scene over time. For example, in some embodiments, the process of FIG. 7 is performed every time a new image is captured, and each new optical gas image is presented to the user on the display, for example, as a real-time optical gas video. Such display can be presented as optical gas image data (e.g., 900) alone or as a processed display image (e.g., 910), for example, including visible light and/or infrared image data. In other examples, the thermal imaging camera can present a traditional image on the display, such as an infrared image, a visible light image, or a combination of visible light and infrared image data, while performing optical gas imaging analysis in the background. In some such embodiments, the thermal imaging camera can be used to acquire an optical gas image (or a display image including optical gas image data) even when the real-time display does not necessarily include optical gas image data.

In various embodiments, a user may select, for example, via a user interface, whether the real-time display and/or any captured image and/or video data includes optical gas image data. In some examples, capturing image data using a thermal imaging camera comprises capturing infrared image data 902, visible light image data 904, and calculated optical gas image data 900 substantially simultaneously. Such image data can be presented in real-time on a display according to a particular blending/processing scheme (e.g., in 908), and/or can be combined after the fact in any way desired by the user for display, for example, on the camera itself or a stand-alone work station. In various embodiments, blending/processing techniques employed for real-time display of the display image 910 can be adjustable by a user. In some examples, the available blending/processing techniques are selectable from a series of pre-defined image combination techniques and/or can be fully customizable by a camera operator.

Since optical gas imaging typically leverages the ability of the gas to absorb in the infrared spectrum to image otherwise transparent gas, optical gas image data is often generated using infrared image data (e.g., 902). Thus, in some embodiments, visible light image data 904 is not necessarily captured in conjunction with the infrared image data 902 and the generating of optical gas image data 900. In in exemplary embodiment, optical gas image data 900 is generated according to the process shown in FIG. 8. For each iteration of the process of FIG. 8, when a new image 804 is captured in order to generate an optical gas image 840, the new image 804 comprises infrared image data 902 while the corresponding optical gas image 840 comprises the optical gas image data 900 corresponding to the infrared image data 902. In some such embodiments, visible light image data 904 can be captured along with the infrared image data 902. Put another way, in some examples, infrared image data 902 and optionally visible light image data 904, are captured at a framerate (e.g., 60 Hz.). The captured infrared image data 902 is used as the new image 804 in the process of FIG. 8 for generating an optical gas image 840 including optical gas image data 900. It will be appreciated that, if visible light image data 904 is used to generate optical gas image data 900, infrared image data 902 can be excluded and a similar process can be performed using visible light image data 904.

During an exemplary gas imaging process, if the thermal imaging camera is sufficiently stationary (e.g., on a tripod), long time constants $\tau_{background}$ and $\tau_{foreground}$ can be used to increase the amount of filtering and reduce the amount of noise in the filtered foreground and background images. However, as noted elsewhere herein, the time constants $\tau_{background}$ and $\tau_{foreground}$ should be sufficiently different from one another that the difference between the filtered foreground and background images is not approximately zero.

Additionally, in some cases, the time constants should not be so long that certain artifacts effectively obscure thermal image data. For example, in some cases, a thermal imaging camera, such as a thermal imaging camera comprising an uncooled sensor assembly, will be subject to internal heating, which can cause the thermal image data to drift over time. In some examples, different image processing techniques are used to reduce such thermal artifacts that appear in the image data. However, if an image filtering time constant is too long (e.g., includes significant contribution from images from a sufficiently long time prior), a combination of scenes with and without, or with different degrees of, thermal drift can make it difficult to compensate for the drift. Accordingly, in some examples, while somewhat long time constants are generally advantageous, time constants can be limited to a maximum value in order to reduce any possible artifacts introduced, for example, by self-heating of the camera.

Additionally or alternatively, other events can lead to inaccuracies in the filtered images that include contributions from image data captured over a time period. For example, if the target scene being imaged by a thermal imaging camera changes (e.g., do to camera motion), images representing the previous target scene may still contribute to the filtered images. For instance, if generating filtered background and foreground images that include contributions from image data captured prior to the camera motion, the blending of image data from different scenes will obscure the resulting image. Moreover, comparing such images, for example, the result of subtracting a filtered background image from a filtered foreground image as described elsewhere herein when at least one of the images includes contributions from multiple target scenes will likely be obscured to the point that gas could not be reasonably detected in the difference image. That is, the images would be generally unsuitable for generating an optical gas image until the previous background scene was effectively decayed from the image.

Similarly, if a user is holding the camera in his or her hand, the image is likely to be less steady when compared to an image captured by a camera fixed on a tripod. Thus, a long time constant that effectively averages many images into a filtered image is more likely to include images taken from several slightly different perspectives as the camera shakes in the user's hand. This can also lead to artifacts, clutter, and general inaccuracy in the filtered image(s), and can obscure gas in an optical gas image.

Thus, there is a tradeoff between using a enough filtering (e.g., large enough sample of frames, a sufficiently large time constant, etc.) to reduce the noise in the filtered foreground and background images as much as possible, and not using so much filtering to risk imparting artifacts or inaccuracies into a filtered image (e.g., due to camera motion, self-heating, etc.). Moreover, the optimal amount of filtering can depend on a variety of parameters, such as whether the camera is mounted or hand-held, or if the camera moves to image a different target scene.

The amount of time required for the previous background scene to effectively decay from the foreground and/or background image depends on the filtering technique employed to generate the filtered foreground and background images. For example, with respect to FIG. 6, if frames 1-5 (the frames taken at the earliest time) are averaged to generate the filtered background image from a two second buffer, the background image will include contributions from a scene for up to two seconds after the scene changes. That is, if the camera pointing is changed so that the camera changes from imaging a first target scene to a second target scene, the filtered background image will include contributions from the first target scene for up to two seconds after the camera pointing is changed. Not only will the camera be less capable of performing optical gas imaging for these two seconds, but the generated image will likely be cluttered and difficult to comprehend, since it could be based on image data from two different scenes (e.g., the difference between the first target scene and the second target scene).

Similarly, if, for example, Equations 3 and 4 are used to calculate the filtered foreground and background images, respectively, the amount of time after which image data from the first target scene will effectively be decayed from the filtered image is a function of the time constants of the filtering process. As described, generally $\tau_{background} > \tau_{foreground}$, and if $\tau_{background}$ is approximately the time it takes for an image to decay to contribute a factor of 1/e into the filtered background image, it will take approximately three time constants ($3 \times \tau_{background}$) after changing from the first target scene to the second target scene for the contribution from the previous scene to fall to 5%. In the example described above wherein $\beta_{background}=0.99$, this would amount to approximately 1.67×3=5 seconds before the previous scene would decay to a 5% contribution. In some cases, this can become frustrating to the user, since the camera would generally be unable to provide an observable scene or a reliable optical gas image for approximately 5 seconds after the camera is moved.

FIG. 10 is an exemplary user interface showing user-selectable options for performing gas imaging operations. In the embodiment of FIG. 10, a user may select to enable or disable gas detection mode using ON and OFF buttons. When gas detection mode is off, the thermal imaging camera will not show optical gas image data on the display, for example, when presenting a substantially real-time display of acquired image data. In some examples, when optical gas imaging is turned off, the thermal imaging camera calculates but does not display optical gas image data. In other examples, when the optical gas imaging is turned off, the thermal imaging camera does not calculate optical gas image data.

The interface of FIG. 10 further includes selectable Image Capture or Video Capture modes of operation. The user can select whether saving optical gas image data is accomplished as standalone optical gas images or as a video stream of optical gas images (the optical gas images or video being optionally combined with infrared and/or visible light image data).

As described elsewhere herein, motion of the camera during an optical gas imaging process can negatively impact the quality of the image. For example, camera motion can lead to slight changes of the imaged scene over the course of acquiring images that contribute to filtered foreground or background image, which can lead to artifacts present in the image data. In the embodiment of FIG. 10, the user is able to select between a tripod mode of operation and a handheld mode of operation. In some examples, each of the tripod mode and handheld mode of operation are associated with predetermined optical gas imaging filtering parameters that affect the amount of contribution of previously captured images. Such predefined filtering parameters can include, for example, the number of frames in buffer 600 that are averaged (e.g., according to Equations 1 and 2) or the time constants $\tau_{foreground}$ and $\tau_{background}$ associated with Equations 3-5 to generate the filtered foreground or background images.

Because a thermal imaging camera supported by a tripod will generally experience less inadvertent motion, the time constants and/or number of frames used for generating the filtered foreground and background images can be longer in order to further reduce noise in the image without as many artifacts introduced into the scene due to camera motion. Thus, in some examples, the number of frames from buffer 600 averaged to generate the filtered background image is greater in the tripod mode of operation than in the handheld mode. In other examples, the background and/or foreground time constant ($\tau_{background}$ and/or $\tau_{foreground}$) associated with the tripod mode is longer than the background time constant associated with the handheld mode of operation. Analogously, the filtering parameter $\beta_{background\_tripod} > \beta_{background\_handheld}$.

Since the foreground time constant is generally shorter than the background time constant, it is generally less prone to developing artifacts over time. Accordingly, in some examples, the foreground time constant ($\tau_{foreground}$) may be the same for both tripod and handheld modes of operation. In other examples, similar to the background time constant, the foreground time constant is longer in tripod mode than in handheld mode. Similarly, in other examples, the number of images averaged from butter 600 to generate the filtered foreground image in tripod mode can be greater than or equal to the number used in handheld mode.

According to the exemplary user interface of FIG. 10, a user may select a mode of operation based on the intended use of the thermal imaging camera. The user may disable gas detection mode when using the thermal imaging camera in a traditional thermal imaging mode, and may enable gas detection mode in order to perform an optical gas imaging process. In some examples, the user may elect to operate in image or video modes of gas detection. Further, the user can select whether to operate the thermal imaging camera in tripod or handheld mode, which can dictate which of a predefined set of filtering parameters are used when generating the optical gas image.

In an exemplary embodiment, the tripod mode of operation includes blending parameters of $\beta_{background}=0.99$ ($\alpha_{background}=0.01$, $\tau_{background}\approx1.67$ seconds) and the handheld mode of operation includes blending parameters of $\beta_{background}=0.99$ ($\alpha_{background}=0.01$, $\tau_{background}\approx1.67$ seconds). In another example, tripod mode of operation includes blending parameters of $\beta_{background}=0.96875$ (31/32) and $\beta_{foreground}=0.9375$ (15/16) and the handheld mode of operation includes blending parameters of $\beta_{background}=0.875$ (7/8) and $\beta_{foreground}=0.75$ (3/4).

In some examples, the optical gas detection interface further includes a "custom" option in which a user can customize setting used for performing optical gas imaging. For instance, in some such embodiments, the thermal imaging camera can be configured to perform image filtering during an optical gas imaging process using one or more adjustable filter parameters. Such adjustable filter parameters can include the number of frames averaged from buffer 600 to generate the filtered background and/or foreground images or the blending ratios, $\alpha$ and $\beta$, and similarly the time constant, $\tau$, of Equations 3-5. Other filtering parameters, for example, relating to higher order IIR filters or the like, can similarly be adjusted by the user. Additionally or alternatively, a user may be able to select a type of filter used to generate the filtered background and/or foreground images, such as selecting between any one or more of a FIR filter, a first order IIR filter, and a higher order IIR filter. Other user-adjustable parameters can include blending and/or processing parameters (e.g., 908) for generating a display image 910 from the optical gas image data 900 and other image data streams.

As described, the camera can be programmed with predefined filtering parameters that can be used when operating in particular modes of operation in which camera motion is more or less likely (e.g., handheld operation vs. tripod operation). However, even within such modes of operation, the camera may move a significant amount, such as panning from one scene to another or as a user moves to a new imaging location. This motion can similarly cause the target scene to change, resulting in possible contributions to a filtered image from different scenes and resulting in a filtered image that is cluttered and inaccurate with respect to the current target scene for the camera.

As described elsewhere herein, adjusting the filtering parameters (e.g., a number of frames averaged from a buffer 600, parameters $\alpha$, $\beta$, $\tau$ from Equations 3-5, etc.) can affect the impact of motion in the target scene by reducing the contribution from frames from an earlier time. For example, with respect to FIG. 6, averaging frames 60-120 at a framerate of 60 Hz will only average images going back one second, rather than averaging, for example frames 1-120, which will average images going back two seconds. Thus, image contribution from a previous target scene will impact the filtered image for less time when filtering over the more recent portion of the buffer.

Similarly, with respect to the filtering described with respect to Equations 3-5, a time constant of approximately 1.67 seconds ($\beta=0.99$, $\alpha=0.01$) will result in a filtered image having contributions of images of approximately 5% or more over approximately the previous 5 seconds. By contrast, a time constant of approximately 0.17 seconds ($\beta=0.9$, $\alpha=0.1$) will result in a filtered image having contributions of images of approximately 5% or more over approximately the previous 0.5 seconds. Thus, reducing $\beta$ (or analogously, increasing a or decreasing $\tau$) reduces the contributions of images from images going back further in time.

In addition to gas absorption and attenuation of infrared radiation, gas present in a target scene also emits infrared radiation that may be detected via an infrared imaging device. For instance, with respect to FIGS. 5A and 5C, beam 574c received at X having amplitude A/2 will generally be due to both attenuation of infrared radiation emitted from source 572 (amplitude A) by gas cloud 570a and infrared radiation of gas cloud 570a itself.

However, issues can arise if the gas cloud (e.g., 570a) absorbs and emits infrared radiation equally at a given wavelength, since the impact of the radiation absorption and emission by the gas would negate one another and would be invisible to an infrared imaging camera. For example, with respect to FIG. 5A, if the gas attenuates radiation from source 572 by half (e.g., from amplitude A to amplitude A/2), but also emits infrared radiation at amplitude A/2, then the total infrared radiation received at X in region 582 will be A/2 (from scene 572)+A/2 (emitted from gas)=A, and therefore the gas will have no impact on the imaged scene. Put another way, the gas will provide insufficient contrast from the background to observe gas in the scene, even using various processing techniques such as image subtraction to emphasize the location and or motion of the gas. It will be appreciated that the relative amount of emission and attenuation with respect to the amplitude A of the source 572 are arbitrary and used for ease of explanation. Often, the amount of attenuation and/or emission of infrared radiation due to the presence of gas will be very small compared to the magnitude of the infrared radiation emitted from the background (e.g., source 572), making it generally difficult to image gas using standard imaging techniques, for example, viewing infrared image data without performing a background subtraction process such as those described elsewhere herein.

In some cases, the amount of contrast caused by gas in an infrared image, or whether the gas will be observable in infrared, is dependent on three main factors. The type of gas impacts the absorption/emission lines within the waveband of the imaging device. The amount of gas, which is dependent on both the concentration of gas within a gas plume and the size (path length) of the gas plume through which the received infrared radiation travels, generally represents the number of gas molecules experienced by the light before the light reaches a camera. In some examples, this can be quantified as a concentration path length (e.g., in ppm-meters). Finally, the difference between the temperature of the gas and the apparent temperature of the scene background can impact the ability to view the gas. The apparent background temperature can be, for example, the calculated temperature of the background based on the received infrared radiation (in some cases, the apparent temperature is calculated based on received radiation and the expected emissivity of the object, and may not be exactly equal to the actual temperature due to variations in the emissivity of the background). Mathematically, in some cases, visual contrast in an infrared image due to gas in the target scene is a function of these features:

$$\text{contrast} = f(\text{gas\_type}, \text{gas\_amount}, |T_{gas} - T_{background}|)$$

The amount of contrast in an image to qualify as making an object in the image "visible" can be quantified, for example, as a signal to noise ratio, wherein the level of the signal (in some cases, the signal due to gas, for example, in an optical gas image) must be significantly large when compared to the noise present in the image. Put another way, the apparent temperature difference between subtracted pixels in an optical gas image must be large enough with respect to the noise equivalent temperature difference (NETD) in the optical gas image in order to reasonably observe the effect of the gas on the optical gas image data.

When viewed in the context of optical gas image data as described elsewhere herein and in U.S. Provisional Application No. 62/507,203, filed May 16, 2017, hereby incorporated by reference in its entirety, wherein a difference between a foreground image and background image is calculated to emphasize motion of gas within the scene, the subtraction eliminates much of the stationary or unchanging signal from the overall scene since the effect of gas on the overall image data is relatively small. Thus, in some such examples, the remaining data in the optical gas image (after the subtraction) generally includes the differences in the scene due to moving gas and remaining noise. The gas will be "visible" if the remaining gas signal is sufficiently large compared to the remaining noise. In some cases, a signal-to-noise ratio of 1.0 is adequate for observing data representing gas in an optical gas image in view of the noise present in the optical gas image, though in some cases, a user may observe the effect of gas at signal-to-noise ratios less than 1.

Generally, the amount of contrast provided by the gas increases with the amount of gas and with the difference between the temperature of the gas and the apparent background temperature. Thus, in such examples, as the amount of gas increases, the contrast caused by the gas increases. Similarly, in such examples, as the difference between the gas temperature and the apparent background temperature increases, the contrast caused by the gas increases. Accordingly, in such examples, given a particular type of gas, in order to meet a minimum contrast threshold desired to ensure visibility of the gas, the gas amount and temperature difference must be sufficiently high. Further, in some examples, if there exists a minimum amount of gas that must be made sufficiently visible during gas imaging (e.g., a threshold level of gas above which concentrations may become hazardous), the difference between the gas temperature and the apparent background temperature must be sufficient to ensure that the minimum amount of gas results in a level of contrast that can be observed.

Various standards exist in gas imaging practices that require particular types of gas to be visible at particular concentrations or amounts. For instance, the OOOOa (Quad-OA) standard requires optical gas imaging to be able to "see" a 50/50 mix of methane and propane at 10,000 parts-per-million (ppm) leaking from a ¼" diameter orifice at a flow rate of 60 grams/hour. This standard provides a type of gas (methane and propane) and an amount of gas (10,000 parts-per-million (ppm) leaking from a ¼" diameter orifice at a flow rate of 60 grams/hour). Per the relationships described above, given these standards, in order for the contrast caused by the gas to reach a level to where the gas is visible, the difference between the gas temperature and the apparent background temperature must be sufficiently large.

In some embodiments, a thermal imaging camera performing an optical gas imaging process such as described herein and in U.S. Provisional Application No. 62/507,203, filed May 16, 2017, hereby incorporated by reference in its entirety, continually acquires new images (e.g., step 706 in FIG. 7) for combining with the previous foreground and background images to establish new filtered foreground and background images to compare to establish a new optical gas image. In some examples, each new image acquired via the thermal imaging camera can be radiometrically calibrated to provide an apparent temperature value for each of a plurality of pixels in the image. Thus, by virtue of acquiring new images for performing an optical gas imaging process, the thermal imaging camera also acquires information regarding the apparent scene temperature. This information can be saved in memory, temporarily or for long-term storage, for further analysis, for example, as described below.

As described above, the difference between a gas temperature and the apparent background temperature observed by a thermal imaging camera can dictate whether or not a given amount and type of gas can effectively be imaged using the thermal imaging camera. In some embodiments, a thermal imaging camera can be configured to receive a gas temperature input representative of the temperature of a gas located in the target scene. In various examples, the gas temperature input can be received in a variety of ways. For instance, in some embodiments, a thermal imaging camera can include or otherwise be in communication with an air temperature measuring tool, for example, as described in U.S. application Ser. No. 14/855,884, filed Sep. 16, 2015, hereby incorporated by reference in its entirety. In some such examples, a measured air temperature can be used as the gas temperature input when the gas in the environment is likely to quickly equilibrate to approximately air temperature, making the gas temperature and the air temperature approximately equal. Additionally or alternatively, the thermal imaging camera could be used to capture thermal image data representative of a reservoir containing gas that is to be looked for in a gas imaging procedure, wherein radiometric infrared image data of the tank could be used as a gas temperature input. Additionally or alternatively, a gas temperature input value could be entered manually by a user.

The thermal imaging camera can be configured to, for example, via the processor, compare temperature values associated with each of a plurality of pixels in the radiometric infrared image data with the gas temperature input value to determine, for each such pixel, the difference between the gas temperature and the apparent temperature of the IR image data. As described above, for a given gas type and amount, whether or not the gas can be observed via the infrared imaging camera (has sufficient contrast) is dependent upon this temperature difference. Accordingly, the camera can be configured to analyze each pixel and determine whether or not the difference between the gas temperature and the apparent background temperature at that pixel is large enough so that the pixel would show a predetermined minimum amount of contrast for the identified gas amount and type. In some embodiments, the thermal imaging camera can be configured to modify the display of pixels lacking sufficient difference between the gas temperature and the apparent background temperature to achieve a minimum contrast in the infrared image data for a given type of gas and minimum amount of gas to be detected.

The thermal imaging camera can determine whether or not the difference between the gas temperature and the apparent background temperature is large enough to achieve a desired contrast value can be performed in a variety of ways. In some embodiments, the camera can be programmed with an equation that relates, for a given type of gas, a quantitative measure of a minimum amount of gas to be observed, a quantitative measure of a minimum amount of contrast desired in the image, and a temperature difference. Additionally or alternatively, the thermal imaging camera can include one or more lookup tables in memory that can be used to identify, for a given type of gas and a minimum amount of gas to be observed, the required difference between the gas temperature and the apparent background temperature to achieve a minimum contrast amount to observe the gas.

FIG. 11 shows an exemplary lookup table for determining a required difference between the gas temperature and the apparent background temperature in order to achieve a certain minimum contrast due to a given gas type and gas amount. In the exemplary lookup table of FIG. 11, N different gas types and M different amounts of gas are included. The intersection in the table of a gas type (e.g., gas type n) and a gas amount (e.g., gas amount m) provides a minimum temperature difference value (e.g., $\Delta T (n, m)$) required in order to achieve sufficient contrast in order to observe the given gas type at the given gas amount.

In some embodiments, lookup tables such as the table shown in FIG. 11 can be generated empirically, for example, during a factory calibration of a thermal imaging camera. In some such examples, a technician can observe various combinations of gas types, gas amounts, and differences between the gas temperature and the apparent background temperature to determine the temperature difference ($\Delta T$) at which a given gas type and gas amount provides sufficient contrast in an optical gas image. In various embodiments, sufficient contrast can be identified subjectively by the user, wherein the user observes the point at which the given gas in the given amount becomes sufficiently salient in the image. In other examples, statistical analysis can be performed on the image data to determine a point at which the contrast due to gas in the optical gas image causes statistically sufficient contrast. In some embodiments, different lookup tables can be used for different amounts of contrast and/or for different methodologies of establishing "sufficient" contrast to be able to easily observe gas. In some embodiments, a thermal imaging camera can provide an end-user with the option to perform a self-calibration, in which the user generates a lookup table such as the one shown in FIG. 11. In cameras including a plurality of lookup tables associated with different levels and/or methodologies for determining sufficient contrast to observe gas, a user may be provided with an option to select a table for use. For instance, in some examples, different tables such as the table shown in FIG. 11 can be used when the camera is in a handheld mode vs. a tripod mode.

Once the thermal imaging camera determines, for instance, via the processor, which pixels do and do not include an apparent background temperature sufficiently different from a gas temperature, and therefore which pixels would and would not include sufficient contrast caused by gas in the scene. The processor can be configured to, when generating optical gas image data and/or display image data including optical gas image data, display pixels that do not include sufficient temperature difference in a visibly distinguishable way compared to pixels that do include sufficient temperature difference. That is, those pixels in which a selected amount and type of gas would provide sufficient contrast given the difference between the gas temperature and the apparent background temperature appear differently from those pixels that would not provide sufficient contrast. This displayed information can be presented to a user in substantially real time, such as via a live video. This way, a user may quickly observe where in the scene the desired type and amount of gas would even be possible to view (that is, provide sufficient contrast) and where the gas (e.g., at the minimum desired amount) would not be possible to view (that is, would not provide sufficient contrast).

Figure 12:
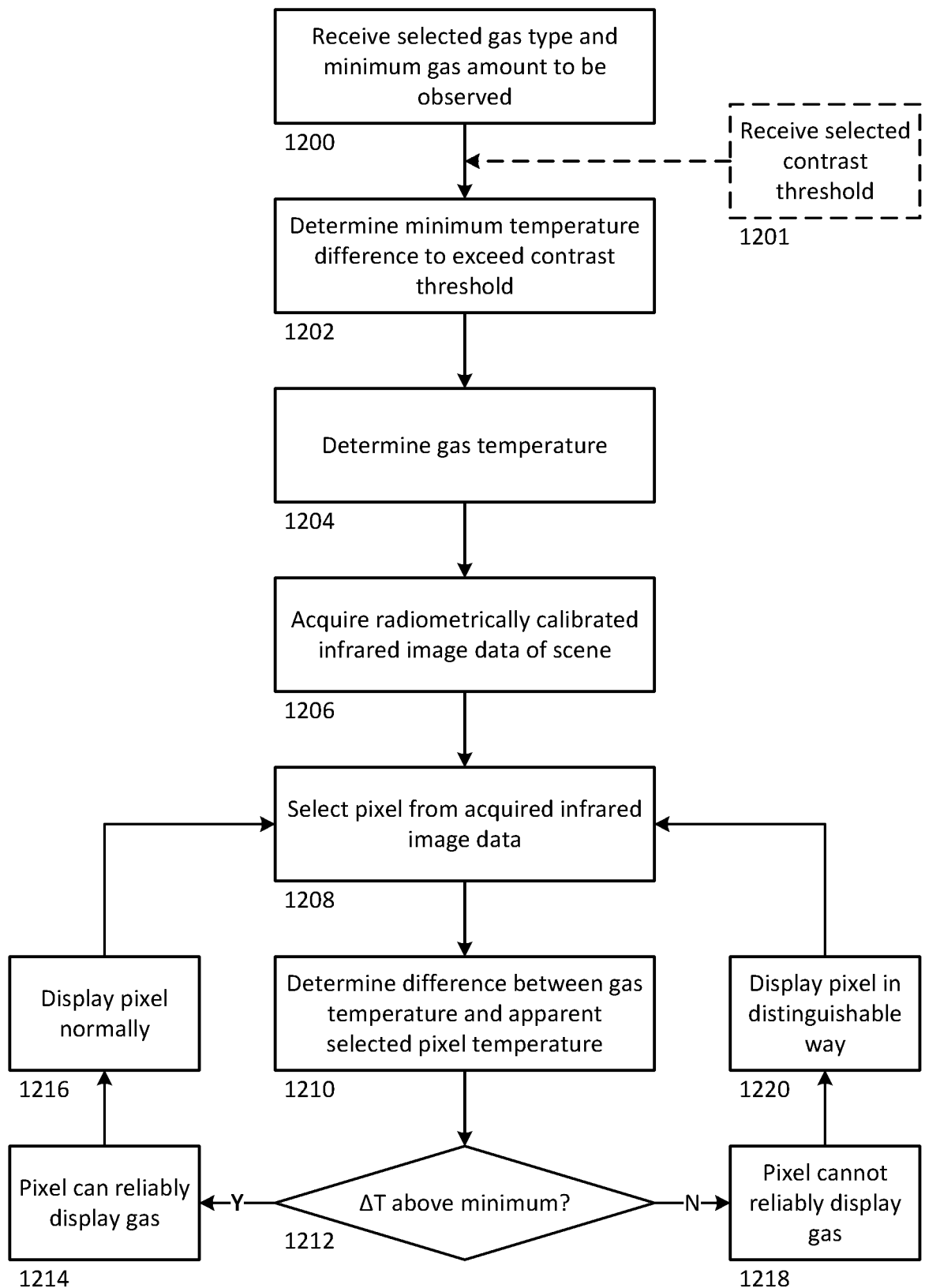
FIG. 12 is a process-flow diagram showing an exemplary process for determining whether or not a pixel can be reliably used to detect a given gas type and amount and for displaying such determinations.

FIG. 12 is a process-flow diagram showing an exemplary process for determining whether or not a pixel can be reliably used to detect a given gas type and amount and for displaying such determinations. The process of FIG. 12 comprises receiving a selected gas type and gas amount (1200). In some examples, a thermal imaging camera can be pre-programmed to search for a minimum amount of a predetermined type of gas. In other examples, a camera can be programmed with a list of gas types (e.g., individual gasses, mixtures of gasses, etc.) and/or minimum amounts of gas to be observed via gas imaging from which a user can select the desired gas type and/or amount.

In various examples, the "amount" of gas can be identified in a variety of different ways. For instance, in some examples, an amount can correspond to a concentration path length of the gas. In other examples, an amount can include a combination of specific parameters, such as concentration, flow rate, and/or orifice leak size, such as may be defined in a particular gas observation standard (e.g., OOOOa). In some such examples, a single value for an "amount" of gas need not be calculated, but can be a combination of values. Such parameters can be pre-programmed into a camera (e.g., a camera programmed to meet OOOOa standards) or can be entered by a user (e.g., by selecting parameters individually or by selecting a predefined set of parameters, such as defined by OOOOa standards).

Additionally or alternatively, other factors can contribute to whether or not a gas will be visible in a scene, such as wind speed, distance from suspected leak source, or the like. In some examples, a thermal imaging camera can include or otherwise be in communication with one or more tools to measure one or more such parameters, such as an anemometer, distance meter, or the like. Additionally or alternatively, some such parameters can be entered manually by a user. Such data may impact the amount of gas that can be scene given a certain temperature difference ($\Delta T$), or similarly, the amount of temperature difference that is necessary to view a given amount of gas. Thus, in some embodiments, such parameters can be used to determine the temperature difference necessary to observe a given gas amount/type.

As described, several parameters can be used to determine, for example, an amount of temperature difference necessary to observe a given type of gas at a given amount. In some such embodiments, one or more such parameters (e.g., wind speed, distance, etc.) can be selectively incorporated into the analysis by a user selection. For instance, a user may choose to incorporate a wind speed measurement into the determination of the minimum temperature difference necessary to observe a given gas type in a given amount, or may choose to ignore such data. In various examples, determination of the minimum temperature difference necessary to observe a given gas type in a given amount can be performed using an equation including a plurality of variable or a multi-dimensional lookup table to accommodate for additional parameters. For instance, in some examples, each of a plurality of lookup tables such as that shown in FIG. 11 can correspond to ΔT values for a given wind speed and/or distance to target.

The method further comprises determining a minimum temperature difference (e.g., the minimum difference between a gas temperature and an apparent background temperature) necessary to exceed a contrast threshold in a gas imaging process (1202). In some examples, the contrast threshold can be a received contrast threshold selection (1201). In other examples, the contrast threshold can pre-set within the thermal imaging camera, for example, based on a factory calibration or a previous user calibration. Determining the minimum temperature difference to exceed the contrast threshold can be performed, for example, using a lookup table (e.g., as shown in FIG. 11), using an equation, or the like. In an exemplary embodiment, a lookup table used to determine the minimum temperature difference (1202) corresponds to a selected gas type and/or gas amount.

The method further includes the steps of determining a gas temperature (1204) and acquiring radiometrically calibrated infrared image data of a scene (1206). As described elsewhere herein, in various embodiments, determining a gas temperature can include measuring a gas temperature, for example, using an air temperature measurement tool, or manually receiving a user-entered gas temperature value. The radiometrically calibrated infrared image data can be captured using the thermal imaging camera.

The process includes selecting a pixel from the acquired infrared image data (1208) and determining the difference between the determined gas temperature and an apparent temperature of the selected pixel (1210). The method further includes determining if the temperature difference (ΔT) is above the determined minimum temperature difference (1212). If so, the pixel can reliably display the selected gas type at amounts equal to or greater than the selected amount (1214), and the pixel is displayed normally according to the display settings of the optical gas imaging process. However, if the temperature difference is below the determined minimum, the pixel cannot reliably display the selected gas present at the selected amount in the image (1218), and is presented in a distinguishable way in an optical gas image view (1220). As shown, the process can be repeated for a plurality of pixels in order to identify which of a plurality of pixels may be suitable for performing reliable imaging of the selected gas type at the selected amount. It will be appreciate that, while shown in FIG. 12 as analyzing a plurality of pixels serially (e.g., determining whether or not the ΔT value is above a minimum for a given pixel, then selecting a new pixel and repeating the analysis), in various examples, such analysis can be performed for a plurality of pixels in parallel.

For instance, in some examples, the process shown in FIG. 12 can be performed for one or more pixels simultaneously or substantially simultaneously. In some such examples, every pixel to be analyzed can be analyzed simultaneously or substantially simultaneously. The process can be repeated temporally to provide a real-time or substantially real-time pixel analysis.

During an exemplary use case, with reference to FIG. 12, a user wishes to observe methane (type of gas) at amounts equal to or greater than 10,000 ppm-meters (gas amount represented as a concentration path length), and inputs such parameters into a thermal imaging camera that receives the parameters at step 1200. The camera 1202 determines, for example, via a lookup table, the minimum temperature difference between the gas and the scene in order to achieve sufficient contrast to reliably view the methane at 10,000 ppm-meters. The thermal imaging camera can determine gas temperature information from an air temperature measurement tool in communication (wired or wireless) with the camera, and captures radiometrically calibrated infrared image data of a scene.

The camera compares, for each of a plurality of pixels, the temperature associated with the image data at that pixel with the gas temperature, and compares the temperature difference with the determined minimum temperature difference. If, for a given pixel, the difference between the apparent temperature in the image data and the gas temperature is above the minimum, then methane gas at 10,000 ppm-meters (or greater) present at that pixel would provide visible contrast in the optical gas image. On the other hand, if the difference between the apparent temperature in the image data at a given pixel and the gas temperature is below the minimum, then methane gas at 10,000 ppm-meters (or greater) present at that pixel would not provide visible contrast in the optical gas image.

In a displayed image, those pixels in which the selected gas at the selected amount may be visible (e.g., due to sufficient contrast) will be displayed in a distinguishable way from those pixels in which the selected gas at the selected amount will not be visible (e.g., due to insufficient contrast). The displayed image that shows those pixels with sufficient temperature difference to observe the selected gas/amount differently from those without sufficient temperature difference to observe the selected gas/amount can include optical gas image data (e.g., 900 in FIG. 9) and/or a display image (e.g., 910 in FIG. 9).

In an exemplary embodiments, pixels that are determined to include sufficient temperature difference in order to achieve sufficient contrast to observe the selected gas/amount are presented normally according to a prescribed display scheme (e.g., with a certain palettization, a certain blending ratio between different data streams, etc.). In some such examples, pixels that are not expected to show sufficient contrast to observe the selected gas/amount can be replaced by or blended with a predetermined indicator color to clearly convey to the user that such pixels do not include a background scene that is adequate for producing enough contrast to be able to observe the selected gas/amount.

In various examples, such a predetermined indicator color can be manually selected by a user or may be automatically programmed into the camera. In some examples, an indicator color is automatically chosen so that the indicator color clearly contrasts with a palettization scheme otherwise used in the image. For instance, when utilizing a grayscale palette for performing a gas imaging procedure, the pixels in which the selected gas/amount would not produce sufficient contrast could be replaced with or blended with a non-gray color, such as red, to clearly indicate the presence of such pixel and the inability to reliably view the selected gas at the selected amount at such pixels.

In some examples, a plurality of indicator colors may be used. For example, in some embodiments, a scene analysis mode may be initiated, in which pixels lacking sufficient temperature difference to reliably display the selected gas at the selected amount may include a first indicator color and pixels having sufficient temperature difference to reliably display the selected gas at the selected amount may include a second indicator color. Thus, a user may be able to view a scene and easily distinguish between portions of the scene in which the selected gas at the selected amount can and cannot be reliably viewed.

Additionally or alternatively, in some embodiments, any number of indicator colors may correspond to an equal number of temperature difference values to which the difference between the gas temperature and the apparent pixel temperature can be compared. This can be used to establish a range of likelihood for the ability to view a selected gas at a selected amount in a particular scene.

With reference to FIG. 9, when performing a gas imaging process, a user may view real-time live images on a display in order to inspect for gas in the target scene. In various embodiments, the user may choose to view a blend of optical gas image data 900, infrared image data 902, and visible light image data 904 together on the display. In some examples, the indicator color can be blended with or otherwise replace pixels in the optical gas image data 900 prior to any combination with other image streams to produce the display image 910. In some such examples, the indicator color may be selected (manually or automatically) to contrast with both the optical gas image palettization and the infrared image palettization schemes. In other examples, the indicator color may be blended with or otherwise replace such pixels in the display image 910 after processing/blending 908 of the optical gas image data 900, infrared image data 902, and visible light image data 904.

In some examples, during a gas imaging process, the user may choose to exclusively view the optical gas image data 900 on the display. In such examples, the indicator color is combined with or used to replace pixels in the optical gas image data 900 for convenient display.

In some embodiments, given a fixed contrast threshold and gas temperature and a given gas type and gas amount, the only contributing factor to whether or not the difference between the gas temperature and the apparent scene temperature for a given pixel meets the minimum temperature difference is the apparent temperature of the background. That is, in some examples, whether or not a selected gas type and amount can produce sufficient contrast to be observed (e.g., step 1212 in FIG. 12) is dependent only on the apparent temperature at a given pixel. Thus, adjusting the positioning of the camera to change the background scene will change which pixels have an apparent temperature that would yield sufficient contrast given the selected gas type and amount. Accordingly, during use according to some embodiments, a user may notice that a large number of pixels on the display include the indicator color, suggesting that such pixels would not provide adequate contrast to show the selected gas at the selected amount whether or not the gas were present. Thus, the user may choose to reposition the camera in order to change the background to increase the number and/or location of the pixels that would provide adequate contrast to show the selected gas at the selected concentration. In doing so, the user may be provided by substantially real-time updates displaying not only the presence of gas in the scene, but also the portions of the scene in which a selected gas may not be visible at a certain amount due to insufficient background temperature contrast.

Figure 13:
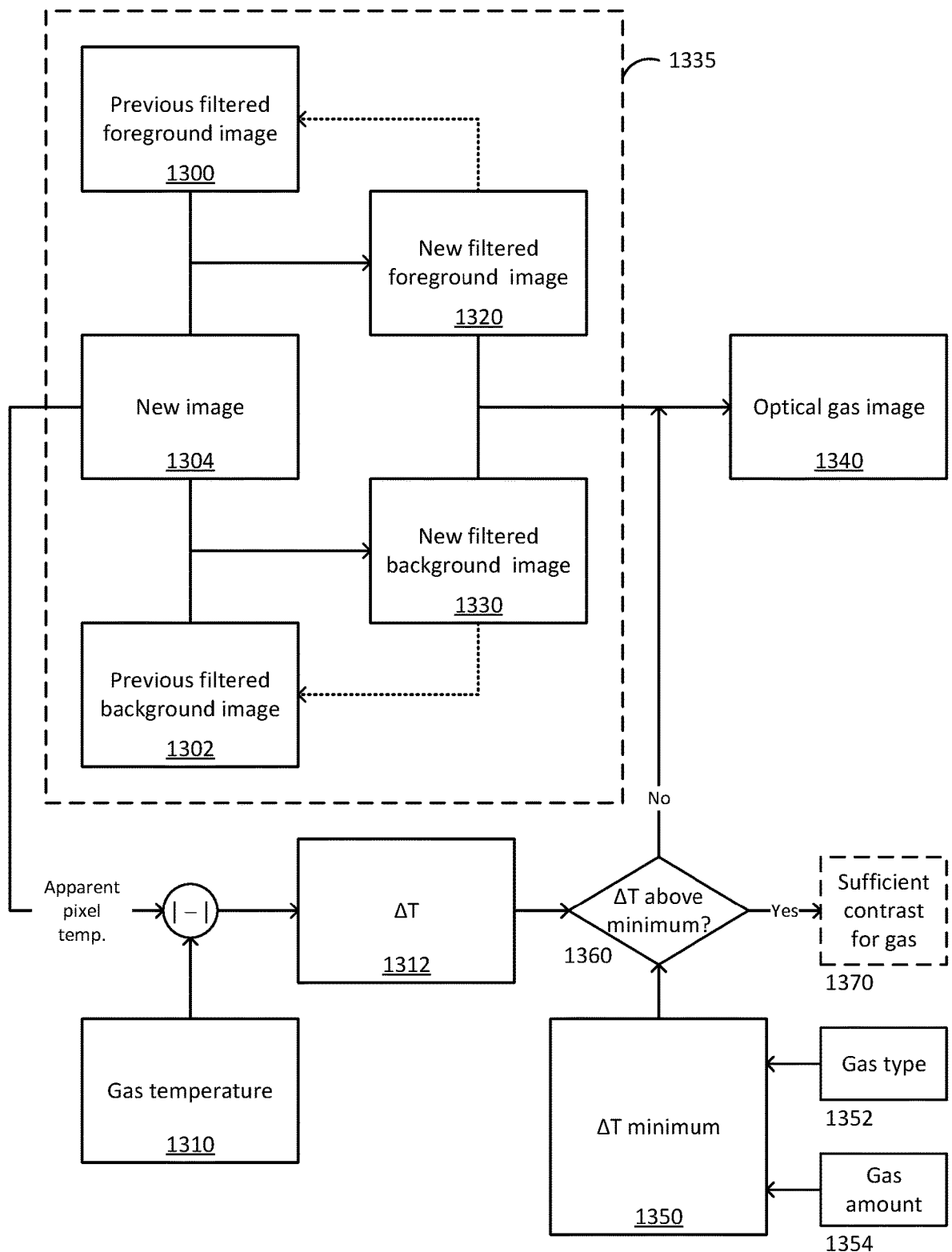
FIG. 13 is a schematic illustration of a process for real-time generation of an optical gas image including information regarding whether or not a given gas type and gas amount is observable at various locations within the optical gas image.

FIG. 13 is a schematic illustration of a process for real-time generation of an optical gas image including information regarding whether or not a given gas type and gas amount is observable at various locations within the optical gas image. Similar to the process illustrated in and described with respect to FIG. 8, the process of FIG. 13 includes using a filtered foreground image and a filtered background image to generate (e.g., via subtraction) an optical gas image 1340. A new image 1304 is captured and combined with a previous/existing filtered background image 1302 to create a new filtered background image 1330. The new image 1304 is similarly captured and combined with a previously/existing filtered foreground image 1300 to create a new filtered foreground image 1320. The new filtered foreground 1320 and background 1330 images can be used to generate an optical gas image 1340. In some embodiments, the new foreground 1320 and background 1330 image become the previous foreground 1300 and background 1302 images, respectfully, during subsequent iterations of the process when a new image 1304 is captured. Details of how, according to various embodiments, the new image 1304 is combined with the previous/existing foreground 1300 and background 1302 images to arrive at the new foreground 1320 and background 1330 images, as well as how the optical gas image 1340 is created from the new foreground 1320 and background 1330 images, are described elsewhere herein (e.g., with respect to FIG. 8), and are not repeated here. Instead, the process is summarized at a high level for convenience in box 1335 in FIG. 13.

In some examples, in addition to being used in the optical gas imaging process (shown generally in box 1335), the new image 1304 can be processed as described above in order to determine where in the image data a certain type and amount of gas can be observed. In the illustrated example of FIG. 13, the apparent pixel temperature for a variety of pixels in a new infrared image 1304 is compared with a gas temperature value 1310 to establish a difference between the gas temperature 1310 and the apparent background scene temperature from new image 1304 at each of a plurality of pixels, generally shown as $\Delta T$ 1312. In some embodiments, the value of the gas temperature 1310 comprises a single value, such as measured via an air temperature sensor, manually entered, or the like, while the apparent pixel temperature from the new image 1304 comprises a two-dimensional array of temperature values within the new image 1304. In such examples, the temperature difference values at $\Delta T$ 1312 will also be a two-dimensional array of values, representing the difference between the gas temperature 1310 and each apparent pixel temperature from new image 1304.

Each value of $\Delta T$ 1312 can be compared to a $\Delta T$ minimum 1350, which can be dependent on a particular gas type 1352 and gas amount 1354 as described elsewhere herein, to determine whether or not the value of $\Delta T$ is above the minimum value (1360). In the illustrated example, if the $\Delta T$ value 1312 for a given pixel is above the $\Delta T$ minimum 1350, then that pixel will include sufficient contrast when observing the gas type 1352 and amount 1354 associated with the $\Delta T$ minimum 1350. However, if, for the given pixel, the $\Delta T$ value 1312 is not above the $\Delta T$ minimum 1350, then the corresponding pixel in the optical gas image 1340 can be made to be visually distinguishable from pixels having a corresponding $\Delta T$ value 1312 above the minimum 1350, for example, by including (e.g., via blending or superimposition of) an indicator color as described elsewhere herein. This process can be performed for each of a plurality of pixels (in series or in parallel processing of two or more pixels) and repeated for each of the plurality of pixels to provide a real-time or substantially real-time optical gas image 1340.

The process shown in FIG. 13 can be repeated each time a new image 1304 is acquired, for example, at the framerate of the thermal imaging camera. In some such examples, the process is repeated at a sufficient frame rate in order to generate a real-time or approximately real-time display of optical gas image data 1340, including an indication (e.g., via an indicator color) of which locations in the image data may not be able to adequately display the selected gas and amount.

As noted elsewhere herein, a user of the thermal imaging camera viewing an optical gas image (or a display image including optical gas image data) may observe the pixels identified as lacking sufficient temperature difference to show sufficient contrast for a selected gas type and amount, and may choose to adjust the position of the camera in order to update the background scene in an effort to reduce the number of such insufficient pixels. Additionally or alternatively, in some embodiments, the thermal imaging camera, while producing optical gas images or display images including optical gas image data in real time or approximately real time, can analyze the image to determine information related to the number and/or location of pixels deemed to have insufficient temperature difference to observe the selected gas type and amount. In some such examples, the thermal imaging camera can be configured to prompt the user to adjust the location of the camera in order to improve the ability for the thermal imaging camera to image the selected gas at the selected amount.

For instance, in an exemplary embodiment, the thermal imaging camera can be configured to track the number of pixels having a difference between the gas temperature and the apparent background scene temperature below the determined minimum temperature difference for a selected type and amount of gas. If the number of pixels having a temperature difference below the minimum is greater than a predetermined threshold (e.g., above a predetermined percentage of analyzed pixels, above a predetermined total number of pixels, etc.) the camera may output an alert (e.g., audio alert, visual alert, vibrational alert, etc.) to the user suggesting that the user reposition the camera to include a different background scene and potentially increase the number of pixels having temperature difference above the threshold.

Additionally or alternatively, in some examples, the camera can determine the location of the pixels lacking sufficient temperature difference to be likely to observe the selected gas at the selected amount, and suggest a user reposition the camera if the pixels are located in identified locations. For instance, in some embodiments, if the center of the image data (e.g., a circular, rectangular, or other shaped region of pixels approximately in the center of the image data) includes a sufficiently large number of pixels having temperature difference below the minimum, the camera may suggest the user reposition the camera in an effort to improve the likelihood to observe the selected gas at the selected amount in the center of the image.

It will be appreciated that, while often described with respect to determining which pixels include sufficient difference between a gas temperature and an apparent background temperature for performing gas imaging, in some embodiments, such analysis can be performed in a plurality of regions that are not necessarily single-pixel regions. For example, in some embodiments, a region comprising a plurality of pixels can be assigned an apparent temperature (e.g., a minimum temperature, a maximum temperature, or an average temperature of the pixels within the region) that can be compared to the gas temperature. Similar analysis as described above can be applied to the region as a whole rather than each pixel individually, for example, to reduce the number of times the analysis is performed on a given image and save on processing time and requirements. In general, regional analysis can be performed on a plurality of regions, each including one or more pixels, wherein such regions need not be the same size.

In some embodiments, a thermal imaging camera can be configured to detect motion of the camera. For example, the thermal imaging camera can include one or more accelerometers or other motion sensors (e.g., MEMs, gyros, etc.) configured to sense motion of the camera. Such sensors can provide data to the processor, which can use the data to determine that the camera has moved or is moving. Additionally or alternatively, the camera can be configured to analyze captured frames to determine inter-scene motion, such as using image registration processing to determine an amount the camera has moved from frame to frame. In some embodiments, the thermal imaging camera can use detected motion data to determine if the camera has moved a sufficient amount to impact the efficacy of the current filtering parameters for generating a high quality optical gas image without clutter or artifacts from a previous target scene.

For instance, in some examples, optical gas imaging processes (e.g., as shown in and described with respect to FIG. 8) comprise subtracting images from one another, leaving only the difference remaining. However, if this difference has relatively low magnitude (e.g., due to a small amount of attenuation due to the presence of an absorbing gas in the scene), the difference image may be difficult to observe without amplifying the signal, or analogously in a thermal image data processing sense, decreasing the span of temperatures (e.g., temperature differences) visible in the display palette in order to distinguish the signal from the background. This results in a strong emphasis of motion in the optical gas image, which often is beneficial in attempting to view gas (e.g., a target gas), but also often magnifies undesired movement, such as due to camera motion.

Figure 14:
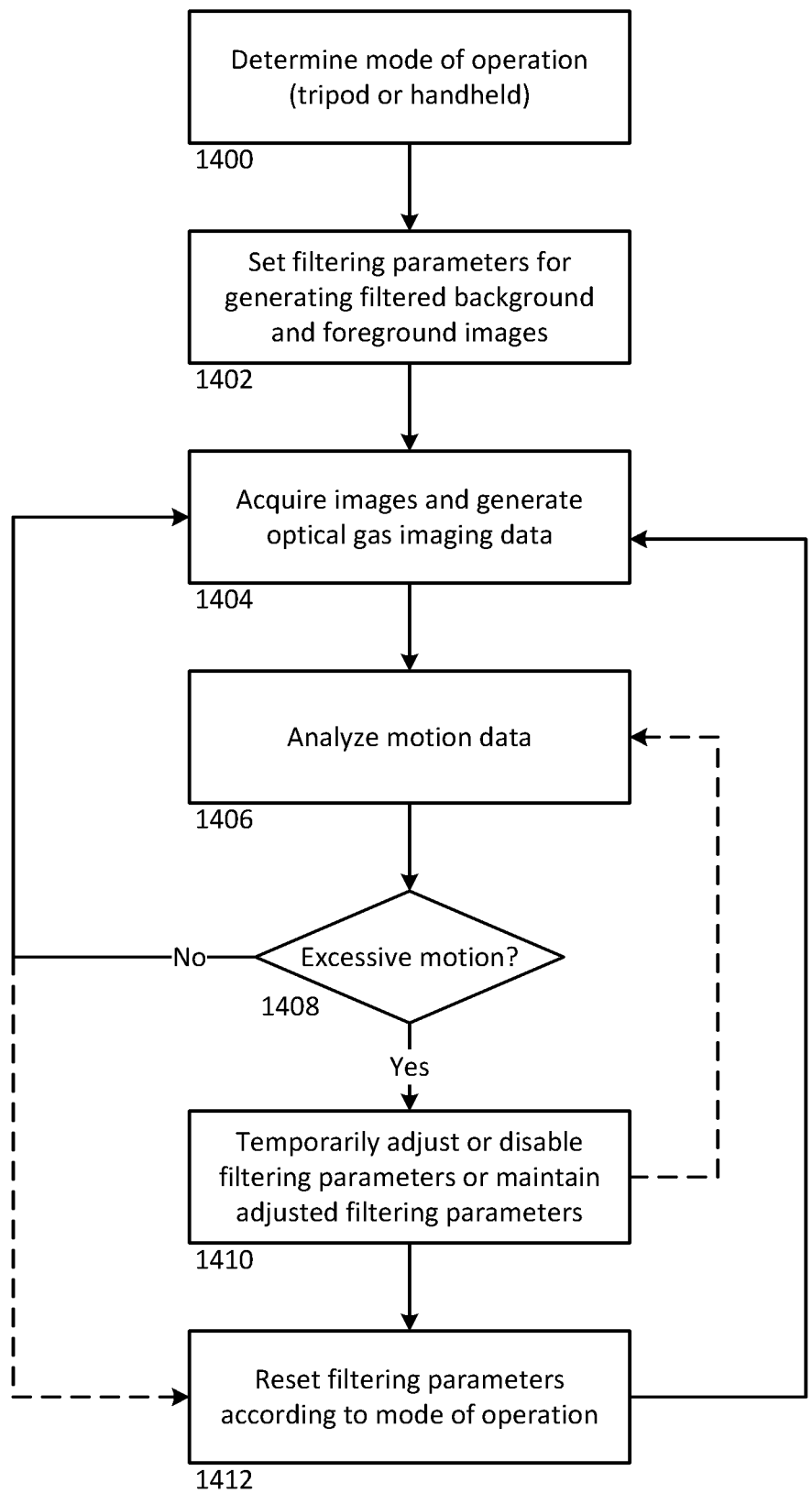
FIG. 14 is a process flow diagram illustrating a process for accommodating for camera motion during an optical gas imaging process.

FIG. 14 is a process flow diagram illustrating a process for accommodating for camera motion during an optical gas imaging process. The method includes determining the current mode of operation of the camera (1400), such as, for example, a tripod mode or a handheld mode, and setting filtering parameters for generating filtered background and foreground images (1402). As described elsewhere herein, such filtering parameters can be predefined parameters based on the current operating state of the thermal imaging camera.

The method includes the step of acquiring images and generating optical gas imaging data (1404). This can include, for example, performing any of the processes described herein, such as using one or more of Equations 1-5 or FIGS. 7-9. The thermal imaging camera can continue acquiring images (e.g., new image 804 in FIG. 8) and generating optical gas image data (e.g., optical gas image 840), for example, at the image acquisition frame rate of the thermal imaging camera.

While performing the optical gas imaging process, the camera can analyze motion data of the camera (1406). Motion data can be provided by any of a variety of sources, for example, one or more hardware components (e.g., accelerometers, etc.), image analysis (e.g., registration processing) or the like. The camera can determine if excess motion is present (1408). In some embodiments, the camera compares an amount of motion (e.g., an amount of rotation, an amount of linear motion within the image data in consecutive scenes based on registration analysis, etc.) to a first threshold. If no excessive motion of the camera is detected, the camera proceeds to acquire images and generate optical gas imaging data (1404) according to typical operation.

However, if excess motion is detected, the camera can temporarily adjust or disable the filtering parameters used in the optical gas imaging process (1410). For example, if performing an first order IIR filtering process according to Equations 3-5, upon sensing excessive motion in step 1408, the camera can reduce the value of $\beta$ (particularly $\beta_{background}$) in order to reduce or eliminate the contribution of frames acquired prior to the detected excessive motion to the filtered images. Doing so can help eliminate clutter or artifacts in the image that may confuse or annoy the user.

In some examples, temporarily reducing the filtering parameters comprises reducing the background and/or foreground filtering parameter $\beta$ to a predetermined value. In some such examples, the predetermined value is zero so that the optical gas image only comprises the most recently acquired image and does not include historical data from before the camera motion took place.

In some examples, such reduction in the filtering parameters occurs for a predetermined period of time, such as for one second, half of a second, or the like. In some such embodiments, after the expiration of such period of time, the filtering parameters are reset according to the normal mode of operation (1412) such as established in step 1400 and optical gas imaging continues at step 1404.

In other examples, after adjusting the filtering parameters (1410), the camera can continue to analyze motion data (1406) as represented by the broken line between 1410 and 1406, and determine if excess motion is still present (1408). If so, the camera maintains the reduced filtering parameters and continues to analyze the motion until the detected motion (e.g., between consecutive frames) reduces below a second threshold. In some such examples, the second threshold can be equal to the first threshold, or can be different from the first threshold. If excessive motion is no longer detected at 1408, then filtering parameters are reset according to the mode of operation (1412) before optical gas imaging is resumed.

In some examples, scene changes that contribute to clutter or confusion in a filtered image (e.g., a filtered background image) are due to changes other than camera motion. Thermal changes in the target scene effectively change the image data captured across a plurality of frames, which can lead to similar errors brought about by camera motion as described elsewhere herein. For example, if a person unexpectedly walks through the target scene, residual thermal artifacts from the person may remain in the filtered images even after the person departs the target scene. In an exemplary embodiment, if a person moves into the target scene, thermal image data representing the person will generally build up in the filtered background image over the course of a few time constants. However, since the foreground time constant is typically shorter than the background time constant, thermal image data representing the person will build up in the filtered foreground image quicker than in the background image. Thus, when comparing the filtered background and foreground images to generate optical gas image data, the differences between the thermal signature of the person in the background and foreground images will make the moving person appear in the optical gas image.

The same principle will apply with any substantive thermal change in the target scene. Similar to motion of the camera, changing of the thermal characteristics of the target scene will tend to cause cluttering of the image due to residual artifacts of the previous scene prior to the changes of the thermal data. As with the motion described elsewhere herein, such residual artifacts will typically last for several time constants until eventually being decayed from the filtered image data.

Figure 15:
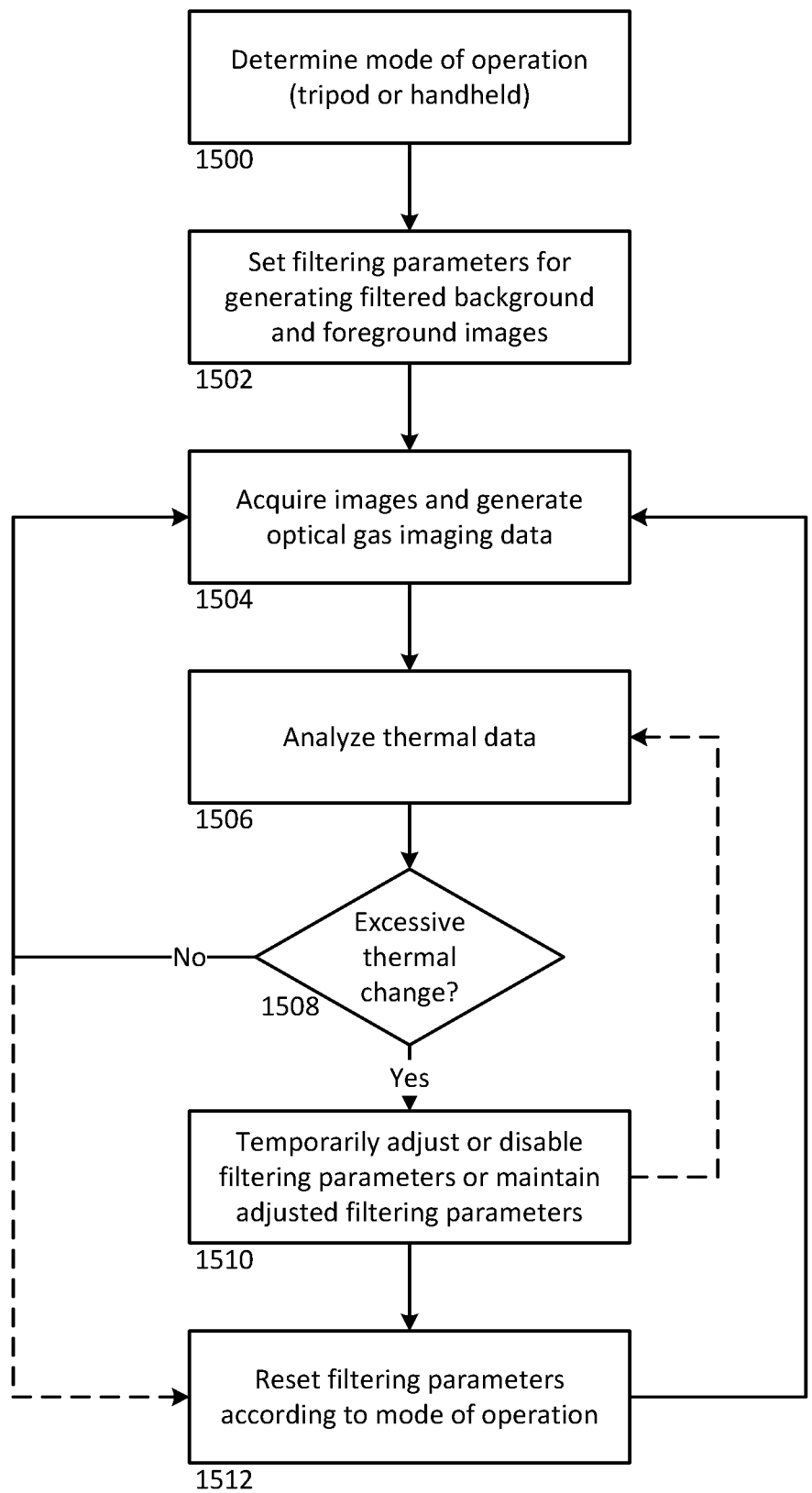
FIG. 15 is a process flow diagram illustrating a process for accommodating for thermal change during an optical gas imaging process.

Artifacts in the filtered images due to thermal changes in the target scene can be addressed in a similar manner to addressing artifacts due to scene motion (e.g., camera motion/jitter). FIG. 15 is a process flow diagram illustrating a process for accommodating for thermal change during an optical gas imaging process. The method of FIG. 15 is similar to that shown in FIG. 14. The method similarly includes determining the current mode of operation of the camera (1500) and setting filtering parameters for generating filtered background and foreground images (1502). The method includes the step of acquiring images and generating optical gas imaging data (1504).

According to the method of FIG. 15, while performing the optical gas imaging process, the camera can analyze thermal data of the target scene being imaged by the camera (1506). Thermal changes can be caused by any variety of sources, such as an object entering or leaving the scene, or an event occurring in the scene causing a significant thermal change. The camera can determine if excess thermal changes are present (1508), for example, by comparing detected changes to a threshold value. Threshold values can include, for example, an absolute temperature change exceeding a threshold or a rate of change of temperature exceeding a threshold. In an exemplary embodiment, the camera compares the rate of change of temperatures (e.g., frame-to-frame changes) in the target scene to a first threshold. If no excessive thermal changes are detected, the camera proceeds to acquire images and generate optical gas imaging data (1504) according to typical operation.

However, if excess thermal changes are detected, the camera can temporarily adjust or disable the filtering parameters used in the optical gas imaging process (1510). For example, if performing a first order IIR filtering process according to Equations 3-5, upon sensing excessive thermal changes in step 1508, the camera can reduce the value of $\beta$ (particularly background) in order to reduce or eliminate the contribution frames acquired prior to the detected excessive thermal change to the filtered images. Doing so can help eliminate clutter or artifacts in the image that may confuse or annoy the user.

As described elsewhere herein, in some examples, filter parameters (e.g., $\alpha$, $\beta$, etc.) can vary within an image during an exemplary filtering process. For example, in a first order IIR filtering process, some pixels or groups of pixels may be updated with a different time constant than other pixels or groups of pixels. With respect to FIGS. 14 and 15, certain changes in the detected image data can be localized to certain regions within the image. For example, with respect to FIG. 15, in some environments, excessive thermal change (1508) might occur due to a localized hot spot appearing in an image (e.g., a person entering a portion of the scene) without affecting other portions of the scene. In some examples, the pixels or regions affected by the thermal change (e.g., the pixels including the person entering the scene) can be identified and distinguished from those unaffected by the change. In some such examples, temporarily adjusting or disabling filtering parameters (1510) can be performed only on the pixels or regions in which the excessive thermal change (1508) is detected. In an exemplary embodiment, such thermal changes can be detected by analysis of consecutive or nearly consecutive unfiltered (e.g., new) infrared images. Comparisons of such images can be used to determine the presence and location of excessive temperature changes that may negatively impact optical gas imaging.

Similarly, with respect to FIG. 14, as described elsewhere herein, certain video compression standards (e.g., MPEG) can be analyzed to detect motion within a scene (e.g., via motion vector analysis). In some embodiments, motion of the entire scene (e.g., due to camera motion) can be detected using such video analysis. However, in other examples, such analysis can be used to determine the portions of the image experiencing scene-to-scene motion (e.g., those affected by movement within the scene). Similarly, in some such examples, filtering parameters associated with individual regions or pixels that experience excessive motion (1408) can be temporarily adjusted or disabled (1410) while the filtering parameters of other regions (e.g., not experiencing excessive motion) can remain unaffected. In some embodiments, image processing to determine excessive motion can be performed on infrared image data. Additionally or alternatively, such image processing can be performed on corresponding visible light image data. In some examples, visible light image data provides a clearer image in which such motion analysis can be performed more easily than in infrared image data.

In still further embodiments, the amount filtering parameters are adjusted due to detected scene changes (e.g., in-scene motion or isolated temperature changes) can be dependent on the amount of scene change detected as such locations. For example, in some embodiments, the amount that filtering parameter of regions or pixels that experience excessive thermal change (1508) are adjusted by an amount dependent upon the amount of detected thermal change.

The processes of FIGS. 14 and 15 are generally effective to minimize artifacts in an optical gas image due to large amounts of camera motion or temperature change in a scene, such as when a user is moving from scene to scene or when a temporary thermal anomaly appears in the scene. However, other issues may also negatively impact optical gas imaging processes. In some cases, a camera may be consistently subject to small amounts of motion, such as hand jitter of a camera operator. In some examples, such motion may be small enough in magnitude to not constitute "excessive motion" in step 1408 in FIG. 14, and so would not result in adjusted filtering parameters according to the method of FIG. 14. In other examples, if the hand jitter did constitute "excessive motion" in step 1408, but was consistently happening, the filtering parameters may be adjusted or disabled too often to perform any adequate gas imaging process. Additionally, operating the camera in a handheld mode as described elsewhere herein can be used to minimize impact of hand motion, but often is accompanied by shorter averaging times and therefore a lower signal-to-noise ratio, reducing optical gas imaging sensitivity.

In some examples, small amounts of motion may be compensated for by using image registration and/or stabilization techniques, which can be performed using hardware and/or software solutions. For example, a gyro-stabilized gimbal platform can be used to physically compensate for frame-to-frame displacements of the camera itself in approximately real-time. In some examples, camera displacements can be determined using hardware components, such as accelerometers and/or gyro sensors.

Digital corrections can utilize methods that search for a frame-to-frame displacement vector that represents the displacement between a current frame and a previous (e.g., a reference) frame. Some such processes iteratively search for the displacement vector that provides the strongest correlation between the current frame and the previous frame. Inputs from hardware motion sensors (e.g., accelerometers, gyro sensors, etc.) can be used as input "seed" to assist in an image stabilization algorithm. However, various such methods are computationally intensive and costly to employ in a thermal imaging camera.

Further, various challenges apply when such stabilization algorithms are applied to background-subtraction infrared optical gas imaging processes, such as one or more processes described herein. Uncooled thermal imaging cameras often experience fixed pattern noise ("FPN") associated with uncooled IR sensors, which can be due to several factors, such as pixel-to-pixel variations in gain and offset parameters, 1/f pixel noise, internal infrared radiation within the camera, and the like. Various techniques are known for correcting for FPN, such as non-uniformity correction ("NUC") processes as described, for example, in U.S. application Ser. No. 13/011,846 filed Jan. 21, 2011, which issued as U.S. Pat. No. 8,760,509 on Jun. 24, 2014, hereby incorporated by reference in its entirety. Some techniques include presenting a substantially uniform thermal scene to the infrared sensor of the thermal imaging camera (e.g., a shutter, the sky, etc.) and establishing a NUC subtraction value for each pixel in order to remove the FPN at the pixel.

Figure 16A:
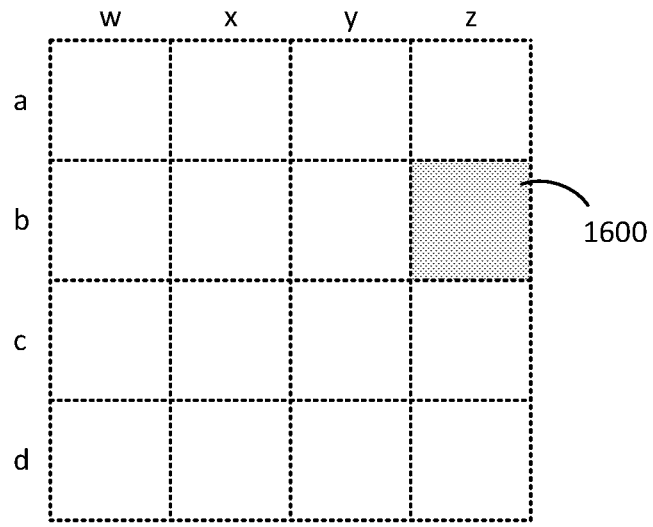
FIGS. 16A and 16B are schematic illustrations simulating camera motion during an optical gas imaging process.
Figure 16B:
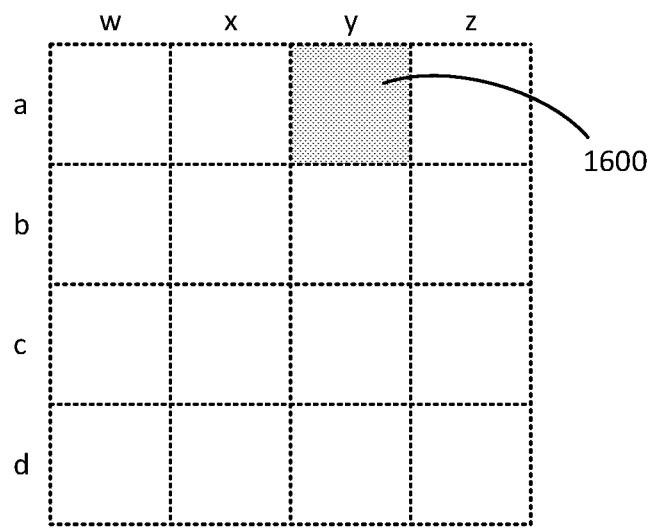

However, FPN can create unique problems when performing optical gas imaging processes utilizing image stabilization techniques, as will be described with respect to FIGS. 16A and 16B. FIGS. 16A and 16B are schematic illustrations simulating camera motion during an optical gas imaging process. FIG. 16A shows exemplary thermal imaging data at 16 pixels of a thermal imaging camera, arranged into rows a, b, c, and d and columns w, x, y, and z. In general, each pixel will include a unique amount of FPN associated with that pixel. For instance, pixel coordinate (a, w) includes fixed pattern noise $FPN_{a,w}$ associated therewith.

As shown, an object 1600 is located at pixel coordinate (b, z) in FIG. 16A. However, in the illustrated example, a short time later, in the image of FIG. 16B, object 1600 is located at pixel coordinate (a, y) due to motion of the thermal imaging camera between the time the image of FIG. 16A and the image of FIG. 16B is captured.

As described elsewhere herein, an optical gas imaging process can be configured to emphasize change in a scene in order to observe the presence of a gas. Thus, differences not due to gas, such as due to camera motion (e.g., between FIGS. 16A and 16B) can cause motion artifacts to appear in the optical gas image. As described above, image stabilization and/or registration processes can be used to correct for this difference. For example, if the thermal imaging camera is configured to perform an image stabilization process to register the images of FIGS. 16A and 16B, such a process would generally result in shifting, for example, the image in FIG. 16B rightward by one pixel and downward by one pixel so that object 1600 is in the same location in each captured image.

However, if unique FPN exists in the image at different pixel locations, it is likely that pixel coordinate (b, z) and pixel coordinate (a, y) have different amounts of FPN associated therewith. Accordingly, in the image in FIG. 16A, the IR intensity value associated with pixel (b, z), $I_{b,z}$, will be due to the combination of the contribution from object 1600, $I_{obj}$, and the FPN associated with the pixel, $FPN_{b,z}$. That is, with respect to FIG. 16A:

$$I_{b,z} = I_{obj} + FPN_{b,z}.$$

Similarly, in the image in FIG. 16B, the IR intensity value associated with pixel (a, y), $I_{a,y}$, will be due to the combination of the contribution from object 1600, $I_{obj}$, and the FPN associated with the pixel, $FPN_{a,y}$. That is, with respect to FIG. 16B:

$$I_{a,y} = I_{obj} + FPN_{a,y}$$

Accordingly, if the images of FIGS. 16A and 16B are registered during an optical gas imaging process, the difference in FPN associated with pixel coordinates (b, z) and (a, y) will appear as a difference in infrared image data at a single location (the location of object 1600 in the registered image stack) such as described above with respect to FIG. 15. The optical gas imaging process may act to emphasize this apparent change in infrared image data over time, obscuring the ability to accurately observe gas in the optical gas image despite the fact that the scene remained static and the origin of the apparent change is attributable to different FPN values at different pixels. Moreover, while the location of object 1600 in FIGS. 16A and 16B is described herein for simplicity, each pixel in the pair of infrared images that are registered to correct camera motion will generally have some apparent temperature change due only to the difference in FPN present at the different pixels that imaged like portions of the target scene (e.g., object 1600).

Eliminating the FPN across a scene, such as by performing a NUC procedure, can mitigate or eliminate such issues arising in optical gas imaging using image stabilization algorithms. However, FPN can evolve over time, and can therefore cause problems during optical gas imaging even if a NUC process is performed. For instance, the amount of FPN needed to negatively impact an optical gas imaging process is typically much lower than the amount of FPN that would be required to negatively impact a typical thermal imaging process. Accordingly, in some such cases, it can be beneficial to perform a NUC process a short time before an optical gas imaging process that utilizes image stabilization and/or periodically throughout such an optical gas imaging process in order to minimize the amount of FPN that appears during the optical gas imaging process.

Figure 17:
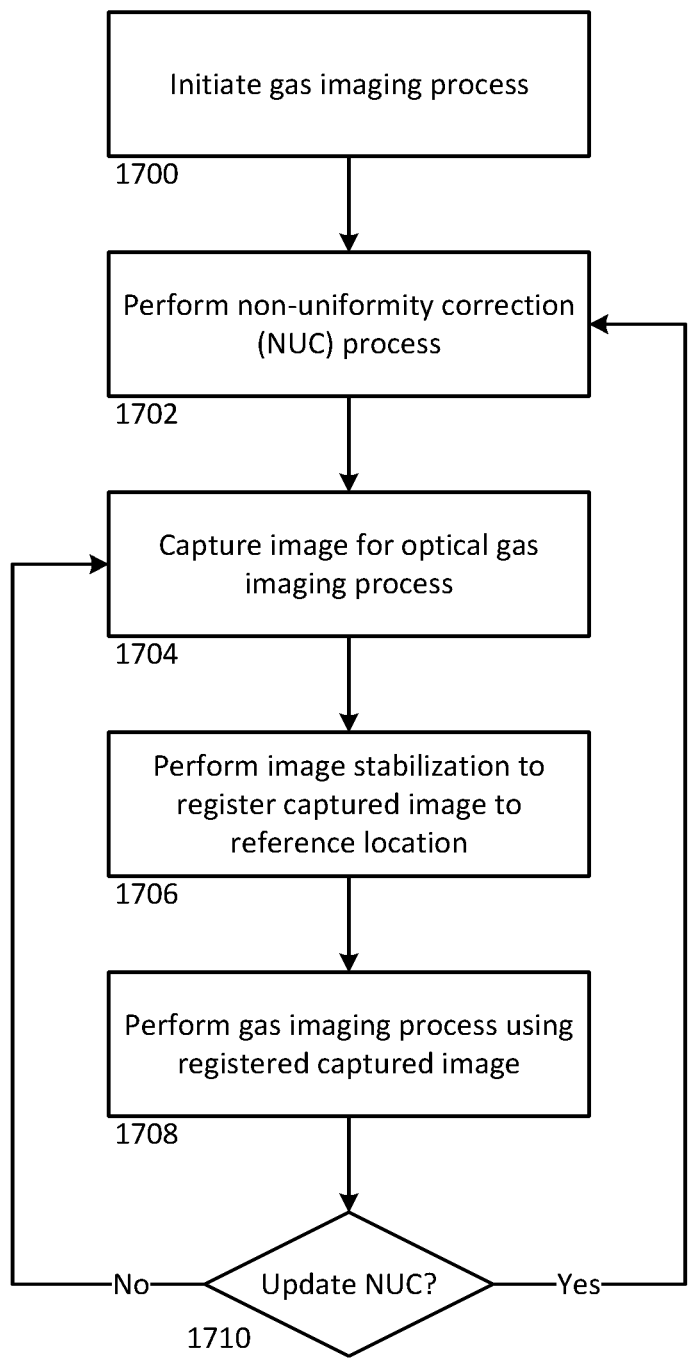
FIG. 17 is a process-flow diagram showing an exemplary combination of performing a NUC process before and/or during an optical gas imaging process that uses image stabilization.

FIG. 17 is a process-flow diagram showing an exemplary combination of performing a NUC process before and/or during an optical gas imaging process that uses image stabilization. The process includes initiating an optical gas imaging process (1700) and performing a NUC process (1700). In some examples, a user may initiate an optical gas imaging process (1700) via a selection on a user interface such as shown in FIG. 10. In some embodiments, the thermal imaging camera may automatically perform a first NUC process (1702) or otherwise instruct a user to perform such a process upon initiating of the optical gas imaging process (1700).

After performing the NUC process, the method includes capturing an image for an optical gas imaging process (1704). The captured image can include, for example, the new image 804 in FIG. 8 for use during an optical gas imaging process. Next, an image stabilization process is performed to register the captured image to a reference location (1706). The reference location can be determined, for example, by the location of a first image captured after the process is initiated. For instance, with respect to FIG. 8, the first new image 804 can establish a reference location, and subsequent "new images" 804 captured during the stabilized optical gas imaging process can be registered to that reference location. Thus, if the image is the first captured during a stabilized optical gas imaging process, the registration process may include defining the reference location to use during subsequent stabilization registrations.

After registering the image, a stabilized optical gas imaging process can be performed (1708), such as the gas imaging process shown in FIG. 8, for example, while utilizing image stabilization techniques to register new images to the reference location. The combination of the image registration (1706) and the NUC process (1702) help compensate for camera motion (e.g., camera jitter) and/or FPN artifacts that may appear during the stabilized optical gas imaging process.

In some examples, a thermal imaging camera can be configured to periodically perform a NUC process or otherwise prompt a user to perform a NUC process. In some such examples, the thermal imaging camera does so after a predetermined amount of time and/or a predetermined number of image frames have been captured. In some examples, the amount of time and/or number of captured frames between performed and/or prompted NUC processes can depend on one or more camera settings. For example, in some embodiments, NUC is performed and/or prompted more frequency during a handheld optical gas imaging mode than during tripod optical gas imaging mode, since greater amounts of registration due to handheld jitter may more quickly and/or severely include FPN artifacts into optical gas image data.

Thus, the process of FIG. 17 can include the step of determining whether or not to update the NUC (1710). If not, then a new image can be captured (1704) and the stabilization/registration (1706) and optical gas imaging (1708) processes can be performed using the captured image, such as according to the process shown in FIG. 8. If NUC is to be updated at step 1710, then a NUC process can be performed (1702) prior to capturing a new image (1704) for the optical gas imaging process.

In an exemplary embodiment, a user may initiate a process similar to that shown in FIG. 17. For instance, a user may initiate a stabilized optical gas imaging process (1700) by depressing a trigger, such as trigger 112 shown in FIG. 1. In an exemplary use case, a user may be performing an optical gas imaging process without using image stabilization (e.g., in handheld mode) prior to initiating a stabilized optical gas imaging process. Upon depression of the trigger, the camera may automatically perform a NUC process (1702) and then perform a stabilized optical gas imaging process (1708) while capturing images (1704) and performing image stabilization (1706) until the trigger is released. In some such examples, a user may perform such a process a plurality of times. For instance, during an exemplary gas inspection, a user may depress the trigger to perform optical gas imaging and watch for gas (e.g., a selected gas) in a first scene, release the trigger, move the camera to view a second scene, and depress the trigger to perform optical gas imaging and watch for gas in the second scene.

Performing optical gas imaging using image stabilization processes may allow for using longer time constants to improve the sensitivity of the optical gas imaging process. For example, image stabilization may eliminate the positioning errors that often make handheld optical gas imaging susceptible to noise and other artifacts due to camera motion. Thus, in some examples, the camera can be configured to, automatically and/or via user selection, use "tripod mode" optical gas imaging time constants while operating in handheld mode with image stabilization.

For example, with further reference to FIG. 10, in some embodiments, a user may select between tripod mode and handheld mode. In some embodiments, selecting handheld mode leads to another screen in which a user may choose to enable or disable image stabilization. In some such embodiments, enabling image stabilization in the handheld mode results in longer time constants than does disabling image stabilization. In some examples, the time constants for handheld mode using image stabilization are approximately the same as the time constants for tripod mode.

In another example, handheld mode automatically includes image stabilization. In some such embodiments, the optical gas imaging time constants are the same when using tripod mode or when using handheld mode with image stabilization. In various examples, a user may manually adjust one or more time constants regardless of the default time constants employed by the camera according to the user settings.

During an optical gas imaging process utilizing image stabilization, even if images are properly registered, in some cases, too much camera pointing drift results in very little overlap between the images to be registered, resulting in a very small usable region in which to perform the optical gas imaging process. In some embodiments, the camera can be configured to provide real-time or substantially real-time feedback to a user regarding how much the camera pointing is drifting during the optical gas imaging process.

Figure 18A:
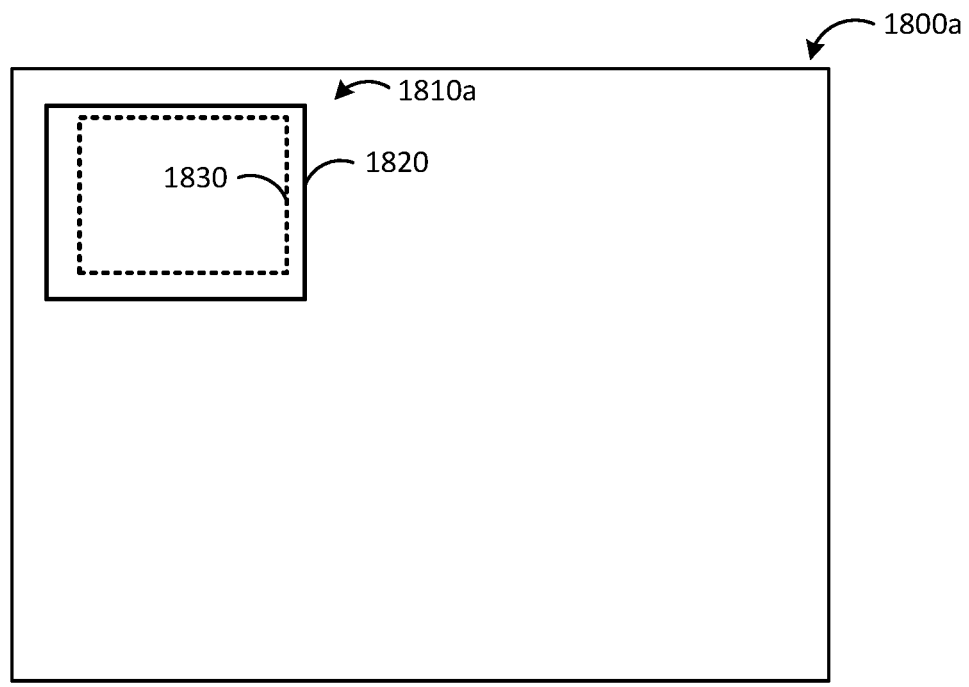
FIGS. 18A and 18B show exemplary display interface indicating to a user an amount of camera drift during an optical gas imaging.
Figure 18B:
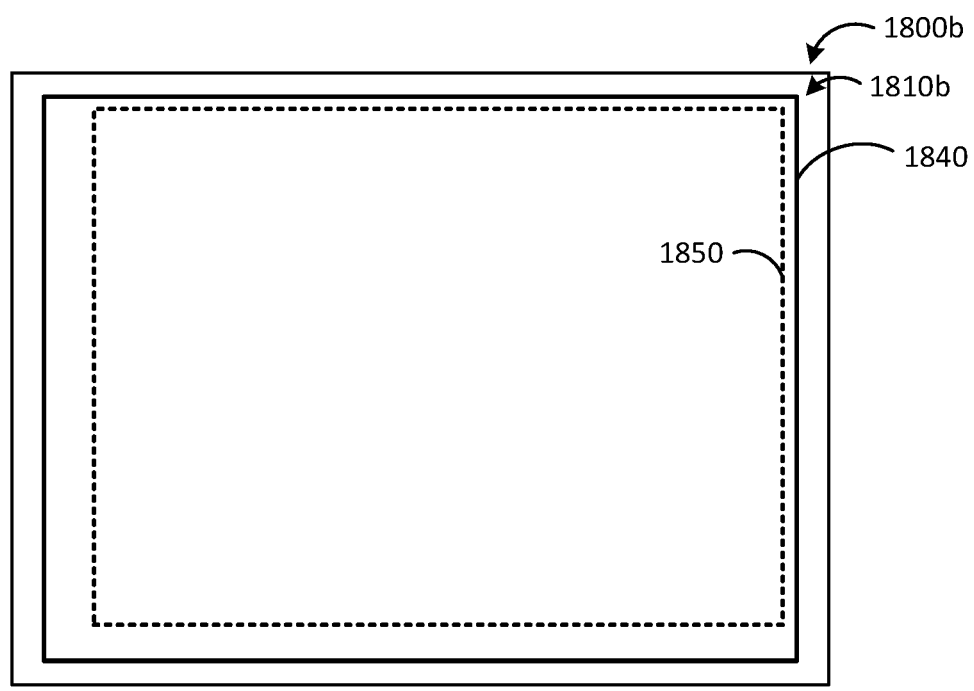

FIGS. 18A and 18B show exemplary display interface indicating to a user an amount of camera pointing drift during an optical gas imaging. FIG. 18A shows an exemplary display 1800a, for example, presentable on display 108 in FIG. 1. The display 1800a includes a pointing drift indicator 1810a that can be used to indicate to a user an amount and/or direction that the pointing of a camera is drifting from a reference position during an optical gas imaging process (e.g., during a stabilized optical gas imaging process). In the example of FIG. 18A, the pointing drift indicator 1810a includes a first marker 1820 and a second marker 1830, slightly smaller than and positioned within first marker 1820. In some embodiments, the display 1800a is updated in real time or substantially real time to indicate camera motion using first 1820 and second 1830 markers.

In an exemplary embodiment, the camera is configured to sense motion or pointing drift of the camera, for example, representing the difference in camera aiming between a recently-captured image and a reference frame, such as an optical gas imaging background image. Such pointing drift can be determined, for example, using one or more motion sensors, such as an accelerometer and/or a gyro sensor. In some such examples, the camera processor (or another system processor) can be configured to receive motion data from a motion sensor to determine the amount of camera displacement relative to a previous or reference position. Additionally or alternatively, the amount of motion can be determined via an image registration calculation, such as performed during an image stabilization process.

Once the amount of motion has been determined, the first 1820 and the second 1830 marker can be positioned relative to one another to represent the amount of motion. For instance, in an exemplary embodiment, the location of the first marker 1820 is fixed in display 1800a and represents a reference location. The location of second marker 1830 is updated with each frame to indicate the position of the captured image relative to the reference location. For example, in some such embodiments, if the camera pointing drifts upward during an optical gas imaging process, the second marker 1830 would similarly move upward with respect to first marker 1820 during the optical gas imaging process. Thus, a user is provided with real time or substantially real time feedback regarding camera position in order to help the user minimize pointing drift during the optical gas imaging process.

The pointing drift indicator 1810a is shown as being positioned in the upper-left corner in display 1800a in FIG. 18A. This location can allow the user to generally view the motion of second marker 1830 relative to first marker 1820 using his or her peripheral vision while still observing the center of the display while looking for indications of gas present in the scene. In some examples, first 1820 and/or second marker 1830 can be presented in a color or colors that contrast from the scene palette and/or each other in order to assist the user in observing the motion of the second marker 1830 relative to the first marker 1820 on the display 1800a.

FIG. 18B shows an exemplary display 1800b, for example, presentable on display 108 in FIG. 1. The display 1800b includes a pointing drift indicator 1810b that can be used to indicate to a user an amount and/or direction that the pointing of a camera is drifting from a reference position during an optical gas imaging process. In the example of FIG. 18B, the pointing drift indicator 1810b includes a first marker 1840 and a second marker 1850, slightly smaller than and positioned within first marker 1840. In some embodiments, similar to display 1800a described with respect to FIG. 18A, the display 1800b is updated in real time or substantially real time to indicate camera motion using first 1840 and second 1850 markers.

In general, first 1840 and second 1850 markers in FIG. 18B can act similar to markers 1820 and 1830 in FIG. 18A, wherein second marker 1850 moves relative to the first marker 1840 to indicate motion of the camera relative to a reference position. However, rather than being positioned in a corner of the display, first 1840 and second 1850 markers surround much of the scene, allowing a user to observe the center of the display 1800b and observe motion of the second marker 1850 at the edge of the screen.

While shown as rectangles in FIGS. 18A and 18B, the pointing drift indicators can generally include any one or more shapes that the user may observe moving with respect to one another as the pointing of the camera drifts during an optical gas imaging process.

Limiting the pointing drift of the camera during an optical gas imaging process utilizing image stabilization, such as by using pointing drift indicators 1810a or 1810b, can improve the efficiency of the image stabilization process. For example, embodiments including one or more pointing drift indicators to help the user manually correct for any camera displacement can reduce the search area for the optimal displacement vector between a captured image and a reference position during the stabilization process. For instance, in an exemplary embodiment, when performing an image stabilization process, the camera may utilize data from one or more position sensors and/or the relative locations of pointing drift indicators (e.g., markers 1820 and 1830) to identify an approximate displacement vector between a reference location and the location of the camera at the time an image was captured. Additionally or alternatively, a camera may limit a search area for an optimal displacement vector to those vectors which would result in the pointing drift indicator indicating a maximum pointing drift. For instance, in an exemplary embodiment with respect to FIG. 18A, a camera performing an image stabilization process may limit the analyzed displacement vectors to only those vectors that would result in displacement that retains the second marker 1830 entirely within the boundary of the first marker 1820. Thus, in such an embodiment, as long as the user maintains the second marker 1830 within the first marker 1820 during operation, the displacement vector best suited for registering a newly-captured image to a reference position will be within the analyzed displacement vectors.

In some examples, limiting the search area for an optimal displacement vector when performing an image stabilization process reduces the processing load required to still produce a real-time or substantially real-time optical gas image using the stabilization process. In some embodiments, the reduced processing load enables additional or more computationally demanding processing steps to be performed while still producing real-time or substantially real-time image data. For instance, in some embodiments, image stabilization techniques can utilize sub-pixel image registration techniques to achieve further improved registration of a captured image to a reference position during real-time or approximately real-time optical gas imaging.

Additionally or alternatively, the computational demand of image stabilization can be reduced by performing the stabilization process using a subset of available pixels for registration. In some such examples, a user can define a sub-region in the image in which to perform stabilization calculations. In various embodiments, this can include drawing an outline of an area or an image or overlaying a predefined shape onto the image to identify the area to be used during image stabilization.

Utilizing a sub-set of image data for image stabilization can reduce the processing time and/or resources necessary for achieving accurate registration. Additionally or alternatively, in some examples, if a portion of the scene includes moving objects (e.g., clouds), the stabilization process could be restricted to a certain region of the image that generally does not include such moving objects that could otherwise interfere with the registration process. Further, in some examples, lenses used in generating image data (e.g., infrared image data) provide a degree of image distortion (e.g., barrel distortion) in the resulting image data. In some such cases, the optimal displacement vector for performing image stabilization varies over the field of the image due to such distortion, leading to unreliable registration and/or increased computational demand for determining the optimal displacement vector. In some such cases, image stabilization calculations can be restricted to being performed in an image area least likely to be impacted by distortion, such as a small, centrally-located region.

In various examples, areas for use during image stabilization calculations can be selected in a variety of ways. In some embodiments, a user may choose an area from a predefined list of options, such as, for example, the full image, an area predefined to reduce the impact of lens barrel distortion, an area defined by a pointing drift indicator, such as first marker 1820, or the like. Additionally or alternatively, as noted elsewhere herein, a user may define a custom area in which to restrict the image stabilization process, such as by positioning and/or sizing a predefined shape over the image or drawing a custom shape over the image.

Image filtering, stabilization, and optical gas imaging techniques described herein can be used to reduce the noise of thermal images so that changes between scenes due to the presence of an infrared absorbing gas in the target scene can be resolved from the noise. Similarly, the adaptability of the filtering techniques can accommodate use in both hand-held and tripod-mounted cameras, maximizing the noise reduction without inducing false residual artifacts into the image data.

The filtering and corresponding optical gas imaging techniques can be used, for example, in a thermal imaging camera including an uncooled sensing array and without the need for expensive optical notch and/or bandpass filters, greatly reducing the cost and complexity of portable systems used for performing such processes. Similarly, such uncooled cameras can themselves be smaller, lighter, and easier to transport from location to location than more complex, cooled thermal imaging cameras, increasing the ease and capability of performing high quality optical gas imaging processes in a plurality of locations using a single camera.

Processes described herein, such as generating filtered background and foreground images and optical gas image data, can be performed using one or more processors, such as processor 222 embedded in a thermal imaging camera that is configured to capture images that are filtered. In some embodiments, processors configured to perform some or all of such processes can be located separately from the thermal imaging camera(s) that acquire the image data.

For example, in some embodiments, a thermal imaging camera can be fixedly positioned in place for continued thermal analysis of equipment under test. The thermal imaging camera can be configured to acquire thermal image data of a target scene and communicate the thermal image data to an external device for subsequent processing, such as a workstation, the cloud, a technician's mobile device (e.g., smartphone, tablet, etc.) or the like. In some such examples, various processing steps can be taken at the external device, such as via software operating on the workstation, an application ("app") running on the technician's mobile device, cloud computing, or the like.

In some examples, substantially real-time optical gas imaging processes can be performed by processing the captured images at the external device. In such examples, the thermal imaging camera used to acquire the image data can be inexpensive and include minimal processing power, but can capture images used for optical gas imaging analysis. Additionally or alternatively, in some examples, processing steps in various processes described herein can be divided among a variety of components, such as a thermal imaging camera that captures thermal images, an external device, or the like.

Various embodiments have been described. Such examples are non-limiting, and do not define or limit the scope of the invention in any way. Rather, these and other examples are within the scope of the following claims.

The invention claimed is:

1. A thermal imaging system, comprising:
   an infrared camera configured to produce infrared image data;
   a user interface; and
   a processor in communication with the user interface and the infrared camera, wherein in response to detection of a user actuation of the user interface and while the user actuation of the user interface remains detected, the processor is configured to:
   apply non-uniformity correction (NUC) values to infrared image data in infrared images of a target scene to produce corrected infrared images;
   register the corrected infrared images using an image stabilization process to produce registered infrared images;
   perform an image-stabilized optical gas imaging process using the registered infrared images to generate optical gas image data indicating a change in the target scene; and generate a display image including the optical gas image data.

2. The thermal imaging system of claim 1, wherein:
the user interface comprises a depressible trigger;
the actuation of the user interface is detected while the depressible trigger is depressed; and
the actuation of the user interface is no longer detected when the depressible trigger is released.

3. The thermal imaging system of claim 1, wherein upon detecting the actuation of the user interface, the processor is configured to perform a non-uniformity correction (NUC) process to establish the NUC values.

4. The thermal imaging system of claim 3, wherein, after the actuation of the user interface is no longer detected and upon subsequent actuation of the user interface, the processor is configured to perform the NUC process to replace the NUC values with new NUC values.

5. The thermal imaging system of claim 1, wherein to generate the optical gas image data, the processor is configured to:
create a filtered background image by combining infrared image data from a first plurality of infrared images using a first filtering process;
create a filtered foreground image by combining infrared image data from a second plurality of infrared images using a second filtering process; and
compare the filtered background image with the filtered foreground image.

6. The thermal imaging system of claim 5, wherein:
combining the infrared image data from the first plurality of infrared images includes determining a weighted average of the infrared image data in the first plurality of infrared images in which infrared image data captured earlier in time is weighted more heavily than infrared image data captured more recently; and
combining the infrared image data from the second plurality of infrared images includes determining a weighted average of the infrared image data in the second plurality of infrared images in which infrared image data captured more recently is weighted more heavily than infrared image data captured earlier in time.

7. The thermal imaging system of claim 5, wherein:
the first filtering process creates the filtered background image using a background time constant such that infrared images captured earlier in time contribute more to the filtered background image than infrared images captured more recently; and
the second filtering process creates the filtered foreground image using a foreground time constant such that infrared images captured more recently contribute more to the filtered foreground image than infrared images captured earlier in time.

8. The thermal imaging system of claim 7, wherein:
when the actuation of the user interface is not detected, the thermal imaging system automatically operates in a handheld mode of operation in which motion of the infrared camera is anticipated;
while the actuation of the user interface is detected, the thermal imaging system automatically operates in a tripod mode of operation in which motion of the infrared camera is not anticipated; and
in the tripod mode of operation, the background time constant and the foreground time constant are longer, respectively, than the background time constant and the foreground time constant in the handheld mode of operation.

9. The thermal imaging system of claim 5, wherein:
when the actuation of the user interface is not detected, the thermal imaging system automatically operates in a handheld mode of operation in which motion of the infrared camera is anticipated;
while the actuation of the user interface is detected, the thermal imaging system automatically operates in a tripod mode of operation in which motion of the infrared camera is not anticipated, and
in the tripod mode of operation, the first plurality of infrared images and the second plurality of infrared images include more infrared images, respectively, than the first plurality of infrared images and the second plurality of infrared images in the handheld mode of operation.

10. A method for performing optical gas imaging, comprising:
in response to receiving a command to perform an image-stabilized optical gas imaging process:
applying non-uniformity correction (NUC) values to infrared image data in infrared images of a target scene to produce corrected infrared images;
registering the corrected infrared images using an image stabilization process to produce registered infrared images;
performing the image-stabilized optical gas imaging process using the registered infrared images to generate optical gas image data indicating a change in the target scene;
generating a display image including the optical gas image data; and
repeating the foregoing steps until a command to stop performing the image-stabilized optical gas imaging process is received.

11. The method of claim 10, wherein the command to perform the image-stabilized optical gas imaging process is received by detecting a depression of a trigger, and wherein the command to stop performing the image-stabilized optical gas imaging process is received by detecting a release of the trigger.

12. The method of claim 10, wherein registering the corrected infrared images using the image stabilization process comprises performing a correlation calculation using infrared image data only in a sub-region of the corrected infrared images and in a corresponding sub-region of a reference image.

13. The method of claim 10, wherein the image-stabilized optical gas imaging process generates the optical gas image data by:
creating a filtered background image in which infrared image data in a first plurality of infrared images are combined using a first filtering process;
creating a filtered foreground image in which infrared image data in a second plurality of infrared images are combined using a second filtering process; and
comparing the filtered background image with the filtered foreground image.

14. The method of claim 10, wherein:
the first filtering process creates the filtered background image using a background time constant such that infrared images captured earlier in time contribute more to the filtered background image than infrared images captured more recently;
the second filtering process creates the filtered foreground image using a foreground time constant such that infrared images captured more recently contribute more to the filtered foreground image than infrared images captured earlier in time; and in response to receiving the command to perform the image-stabilized optical gas imaging process, the background time constant and the foreground time constant are longer, respectively, than the background time constant and the foreground time constant used when not performing the image-stabilized optical gas imaging process.

15. The method of claim 10, wherein, after the command to stop performing the image-stabilized optical gas imaging process is received and in response to subsequently receiving another command to perform the image-stabilized optical gas imaging process, the method includes performing a non-uniformity correction (NUC) process to replace the NUC values with new NUC values.

16. A thermal imaging system, comprising:
an infrared camera configured to produce infrared image data;
a user interface; and
a processor in communication with the user interface and the infrared camera, wherein the processor is configured to perform an image-stabilized optical gas imaging process using infrared images of a target scene captured via the infrared camera, in which the processor is configured to:
apply non-uniformity correction (NUC) values to infrared image data in the infrared images of the target scene to produce corrected infrared images;
register the corrected infrared images using an image stabilization process to produce registered infrared images;
perform the image-stabilized optical gas imaging process using the registered infrared images to generate optical gas image data indicating a change in the target scene; and
generate a display image that includes the optical gas image data and a drift indicator that indicates movement of the infrared camera from a reference position.

17. The thermal imaging system of claim 16, wherein the drift indicator comprises a first marker that indicates the reference position and a second marker that indicates a current position of the infrared camera relative to the reference position.

18. The thermal imaging system of claim 17, wherein:
the first marker is positioned in the display image at a fixed location;
the second marker is positioned in the display image at a location within the first marker when the infrared camera is in the reference position; and
the location of the second marker in the display image is updated to indicate the current position of the infrared camera relative to the reference position.

19. The thermal imaging system of claim 17, wherein the image stabilization process includes performing a correlation calculation using infrared image data only in a sub-region of the corrected infrared images and in a corresponding sub-region of a reference image, and
wherein an area of either the first marker or the second marker defines the sub-region of the corrected infrared images and the corresponding sub-region of the reference image.

20. The thermal imaging system of claim 16, wherein after a predetermined amount of time has elapsed or after a predetermined number of infrared images have been captured, the processor is configured to perform a non-uniformity correction (NUC) process to replace the NUC values with new NUC values.

* * * * *